United States Patent
Kang et al.

(10) Patent No.: US 7,436,480 B2
(45) Date of Patent: Oct. 14, 2008

(54) LIQUID CRYSTAL DISPLAY DEVICE AND METHOD OF FABRICATING THE SAME

(75) Inventors: Dong Ho Kang, Gumi-si (KR); Tae Yong Jung, Gumi-si (KR); Jong Hoon Bae, Sacheon-si (KR)

(73) Assignee: LG Display Co., Ltd., Seoul (KR)

( * ) Notice: Subject to any disclaimer, the term of this patent is extended or adjusted under 35 U.S.C. 154(b) by 377 days.

(21) Appl. No.: 11/314,314

(22) Filed: Dec. 22, 2005

(65) Prior Publication Data

US 2006/0139553 A1 Jun. 29, 2006

(30) Foreign Application Priority Data

Dec. 23, 2004 (KR) .................. 10-2004-0110885
Oct. 19, 2005 (KR) .................. 10-2005-0098755

(51) Int. Cl.
*G02F 1/1345* (2006.01)

(52) U.S. Cl. .................. 349/149; 349/139; 349/153

(58) Field of Classification Search .................. 349/139, 349/141, 149, 122, 153, 187, 189, 190, 193, 349/40

See application file for complete search history.

(56) References Cited

U.S. PATENT DOCUMENTS

| | | | |
|---|---|---|---|
| 6,392,735 B1 | 5/2002 | Tani | |
| 6,404,480 B2 | 6/2002 | Hirakata et al. | |
| 6,466,294 B1 | 10/2002 | Yamagishi et al. | |
| 6,473,147 B1 | 10/2002 | Nakahara et al. | |
| 2002/0008815 A1 | 1/2002 | Hanakawa et al. | |
| 2002/0054261 A1* | 5/2002 | Sekiguchi | 349/122 |
| 2004/0125326 A1 | 7/2004 | Hee | |
| 2004/0135941 A1* | 7/2004 | Nam et al. | 349/110 |
| 2006/0139553 A1* | 6/2006 | Kang et al. | 349/149 |
| 2006/0139556 A1* | 6/2006 | Ahn et al. | 349/153 |
| 2007/0279543 A1* | 12/2007 | Park et al. | 349/40 |

FOREIGN PATENT DOCUMENTS

| | | |
|---|---|---|
| JP | 2002-049054 | 2/2002 |
| JP | 2003-262878 | 9/2003 |
| TW | 561292 | 11/2003 |
| WO | WO 99/52011 | 10/1999 |

* cited by examiner

*Primary Examiner*—Brian M Healy
(74) *Attorney, Agent, or Firm*—McKenna Long & Aldridge LLP

(57) ABSTRACT

This invention relates to a liquid crystal display device that is adaptive for being made in small size as well as shortening process time, and a fabricating method thereof. A liquid crystal display device according to an embodiment of the present invention includes an upper substrate where a common electrode is formed; a lower substrate that faces the upper substrate; a plurality of gate drive integrated circuits that supplies a gate signal to a gate line that is located on the lower substrate; a plurality of data drive integrated circuits that supplies a data signal to a data line that is located on the lower substrate; a common line that supplies a common voltage to the common electrode through the gate drive integrated circuit and the data drive integrated circuit when driving a liquid crystal; and a conductive sealant that electrically connects the common electrode to the common line in one of an area of between adjacent gate drive integrated circuits and between adjacent data drive integrated circuits.

24 Claims, 24 Drawing Sheets

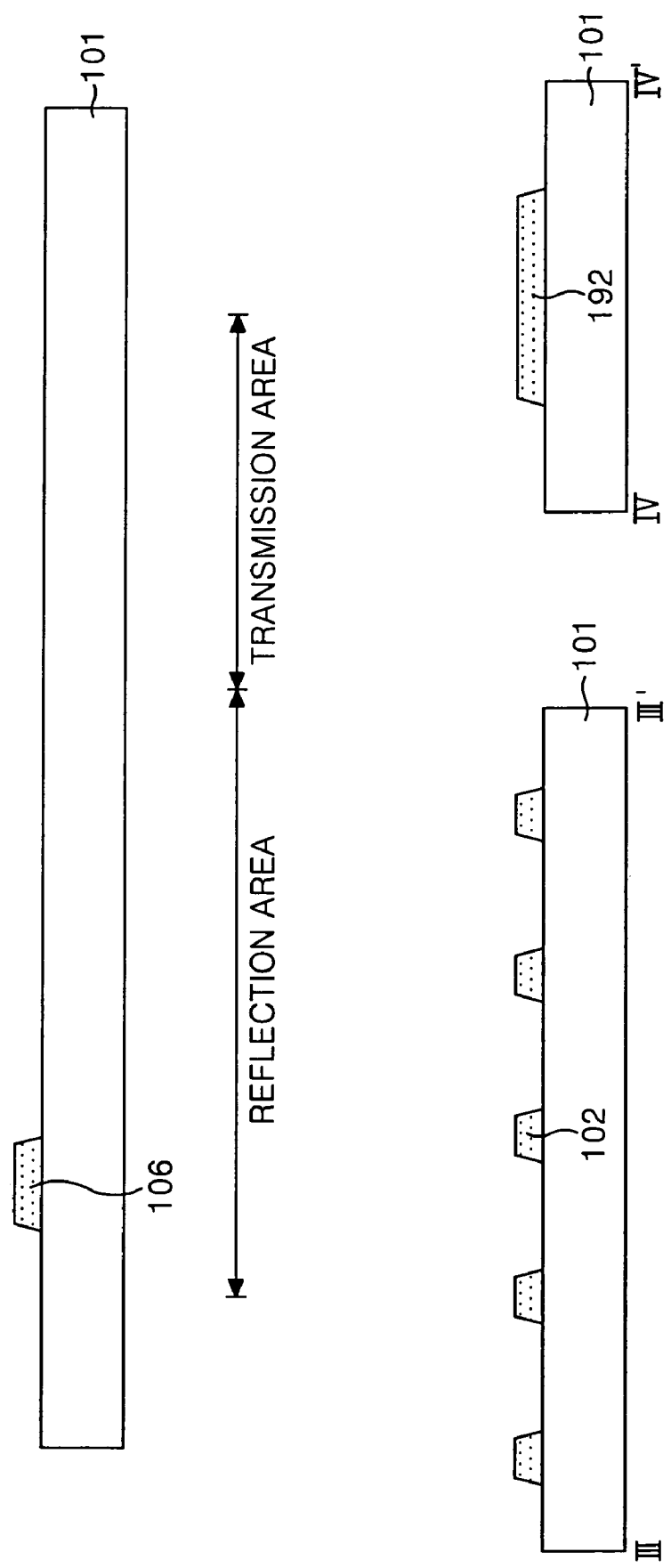

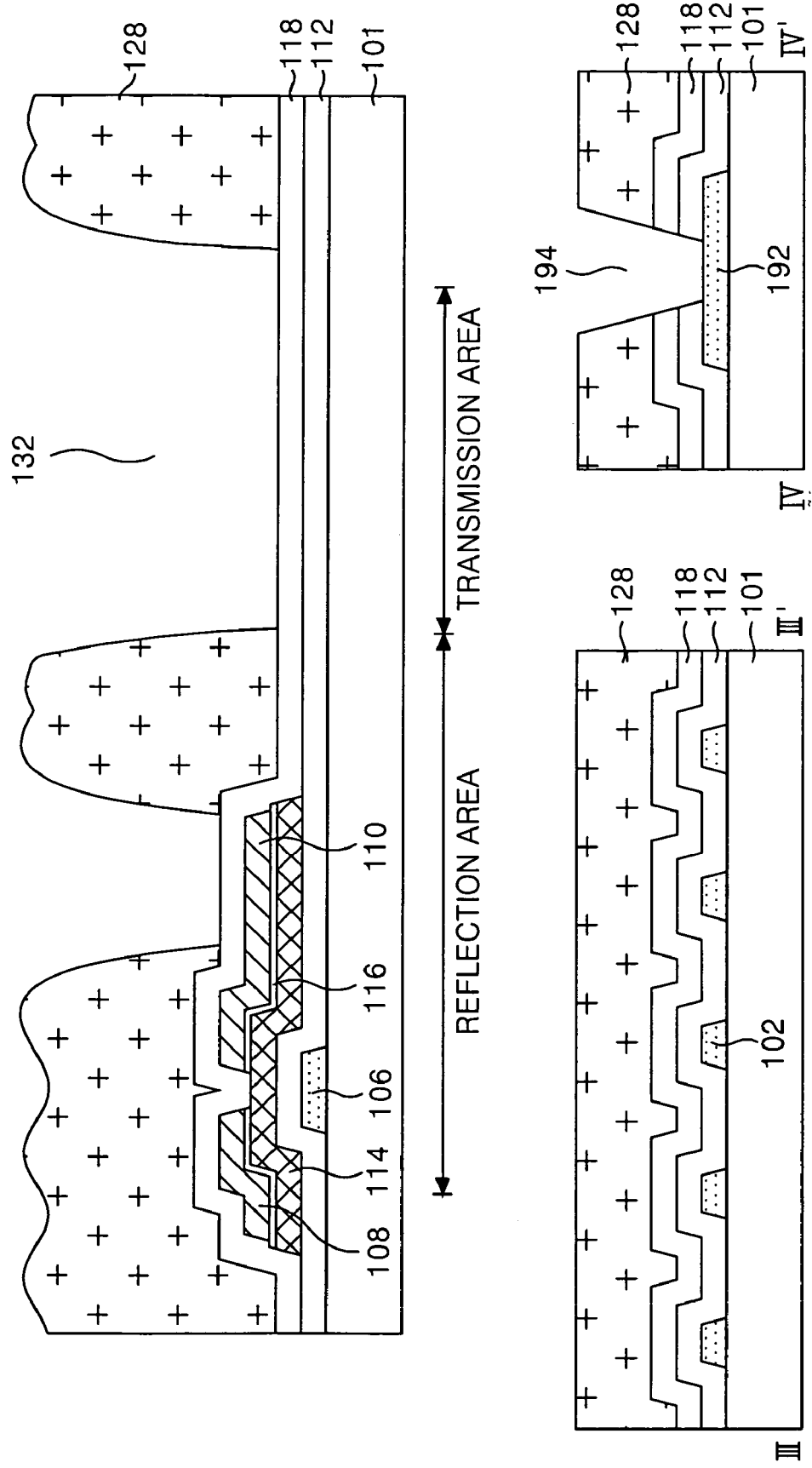

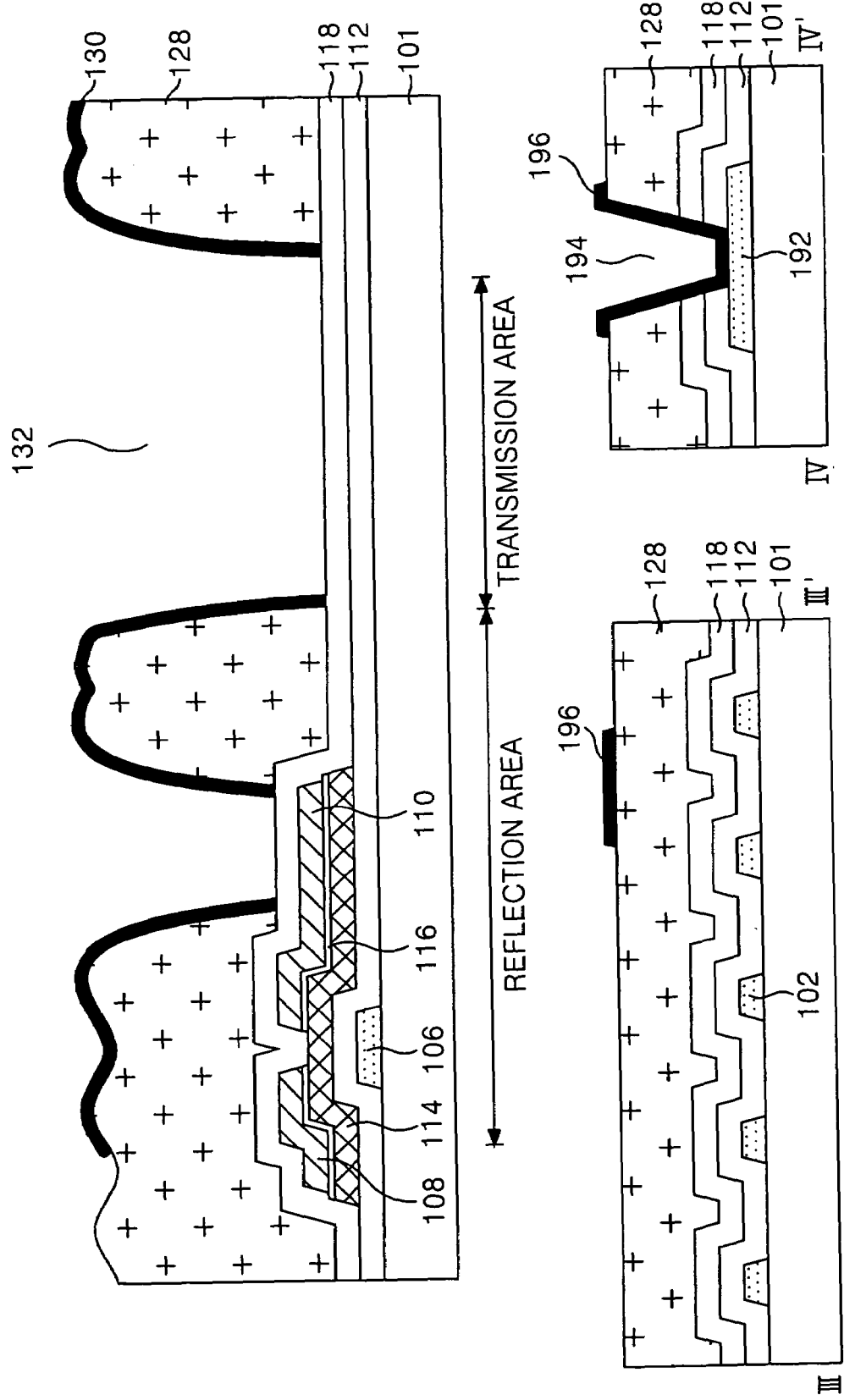

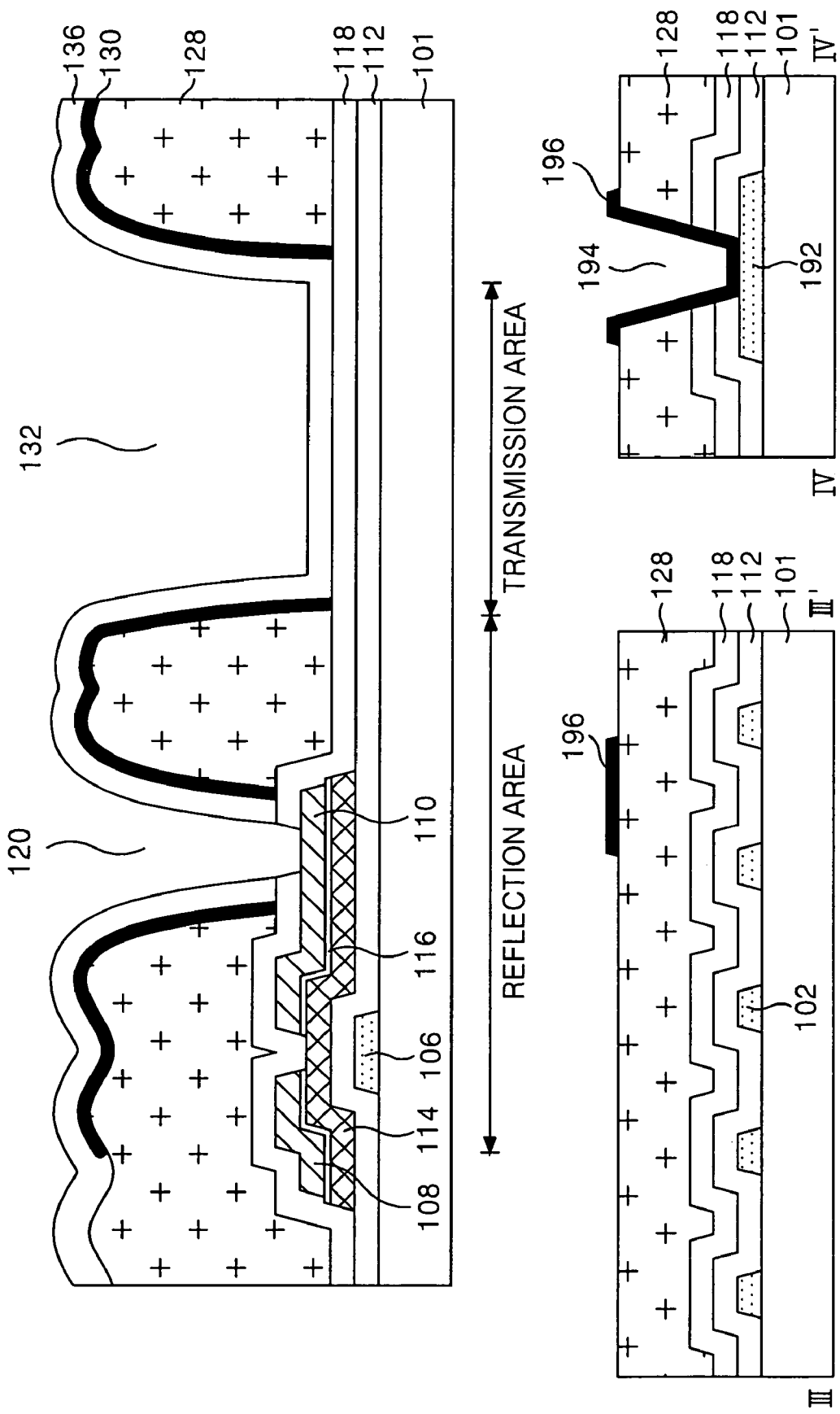

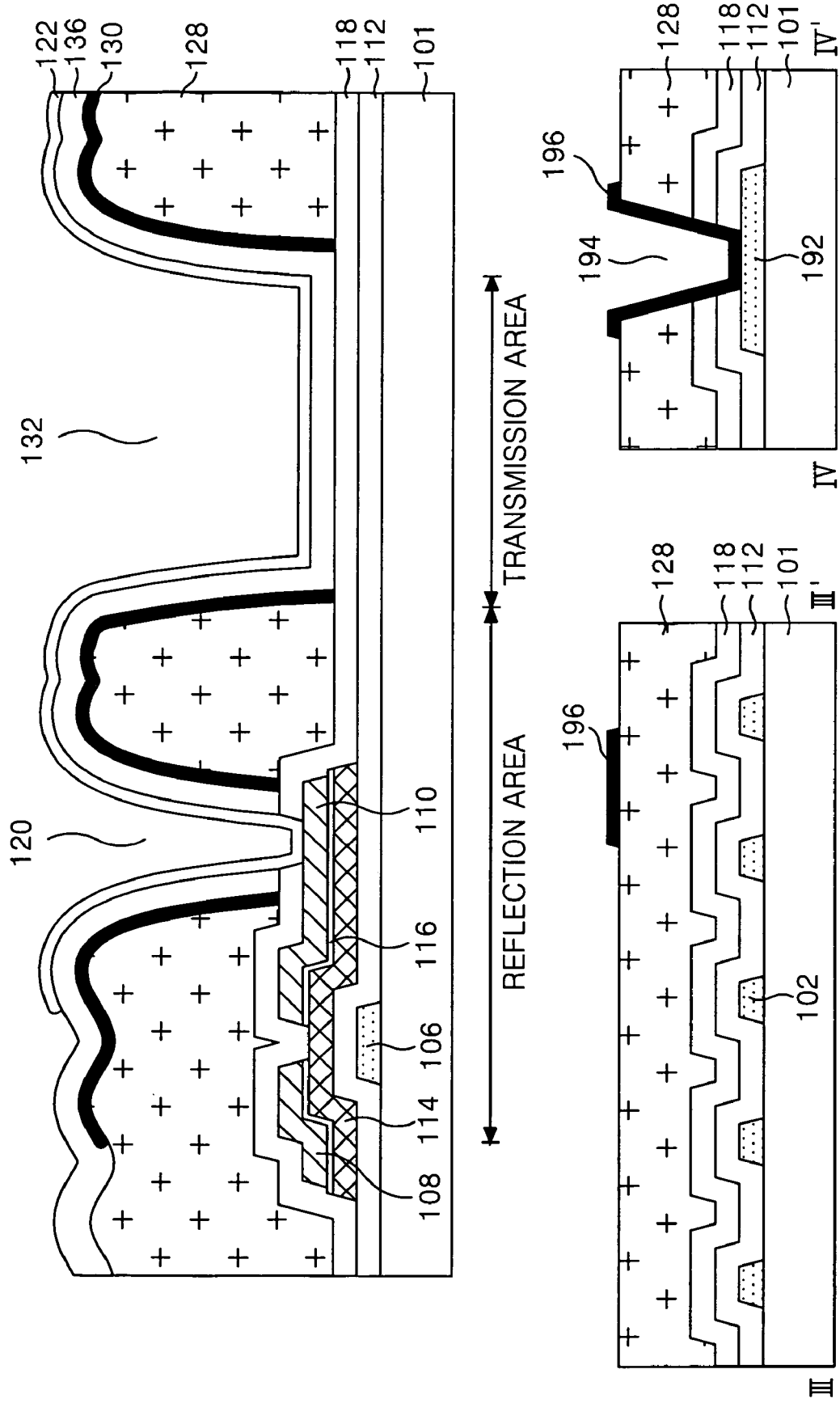

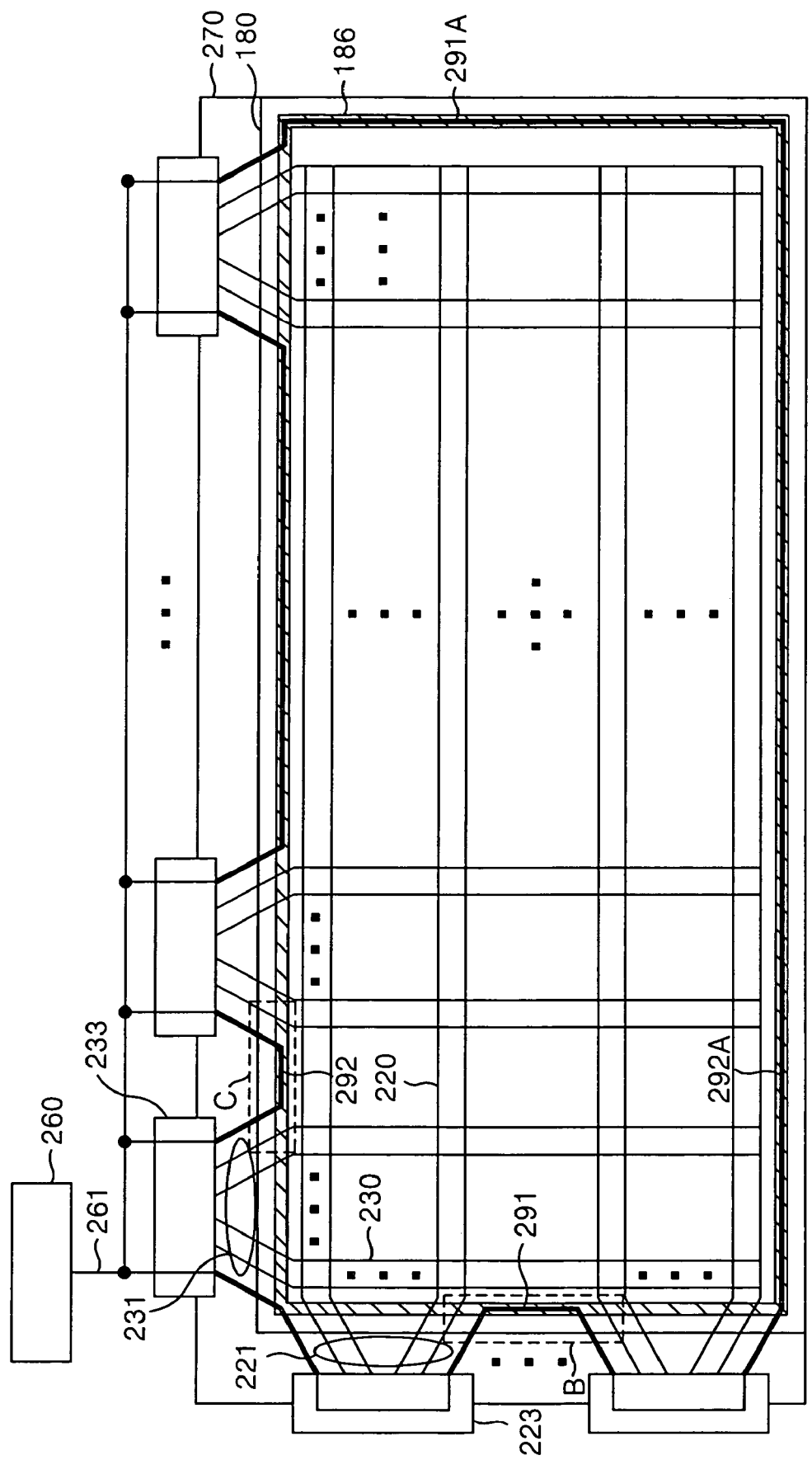

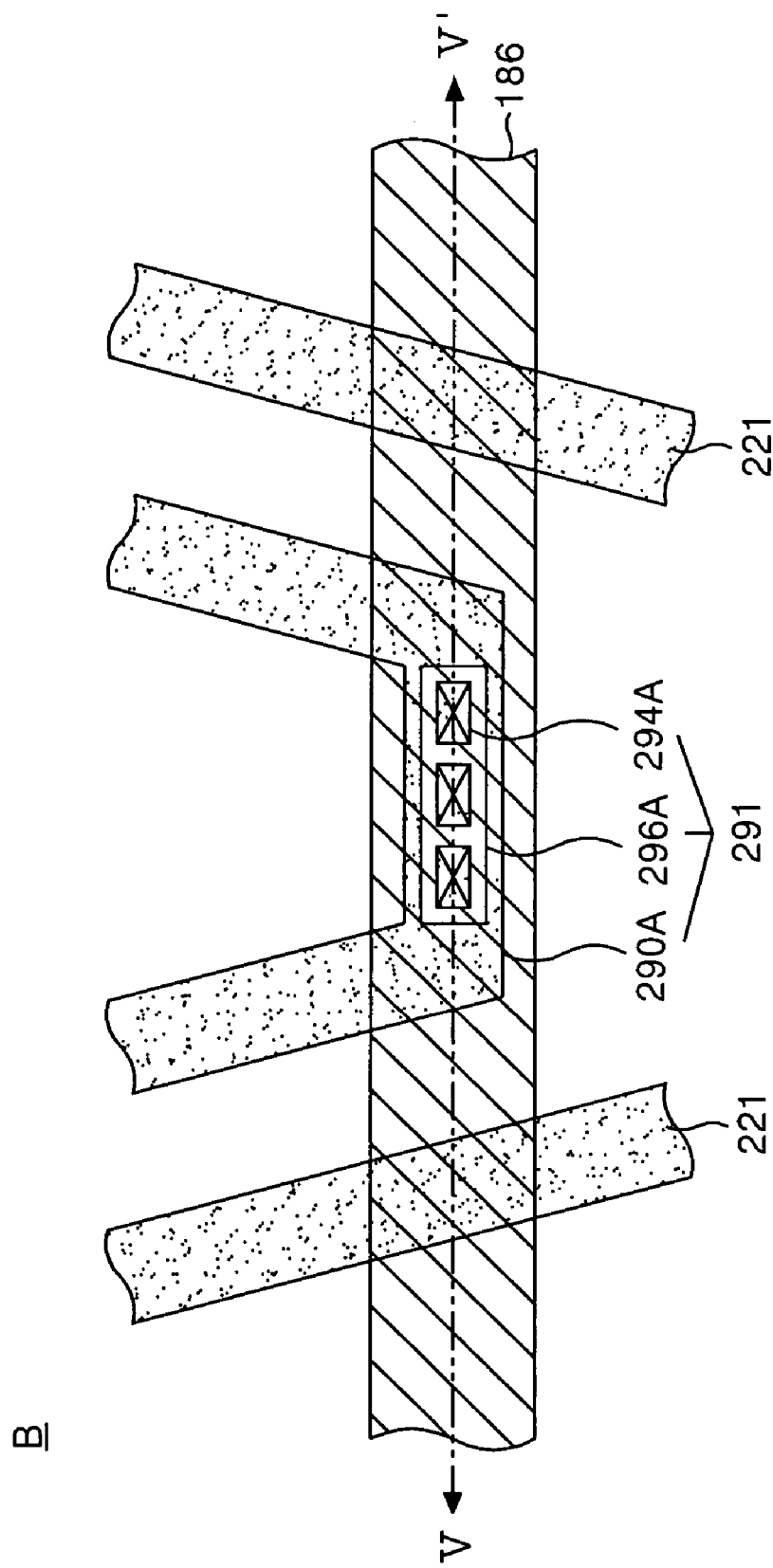

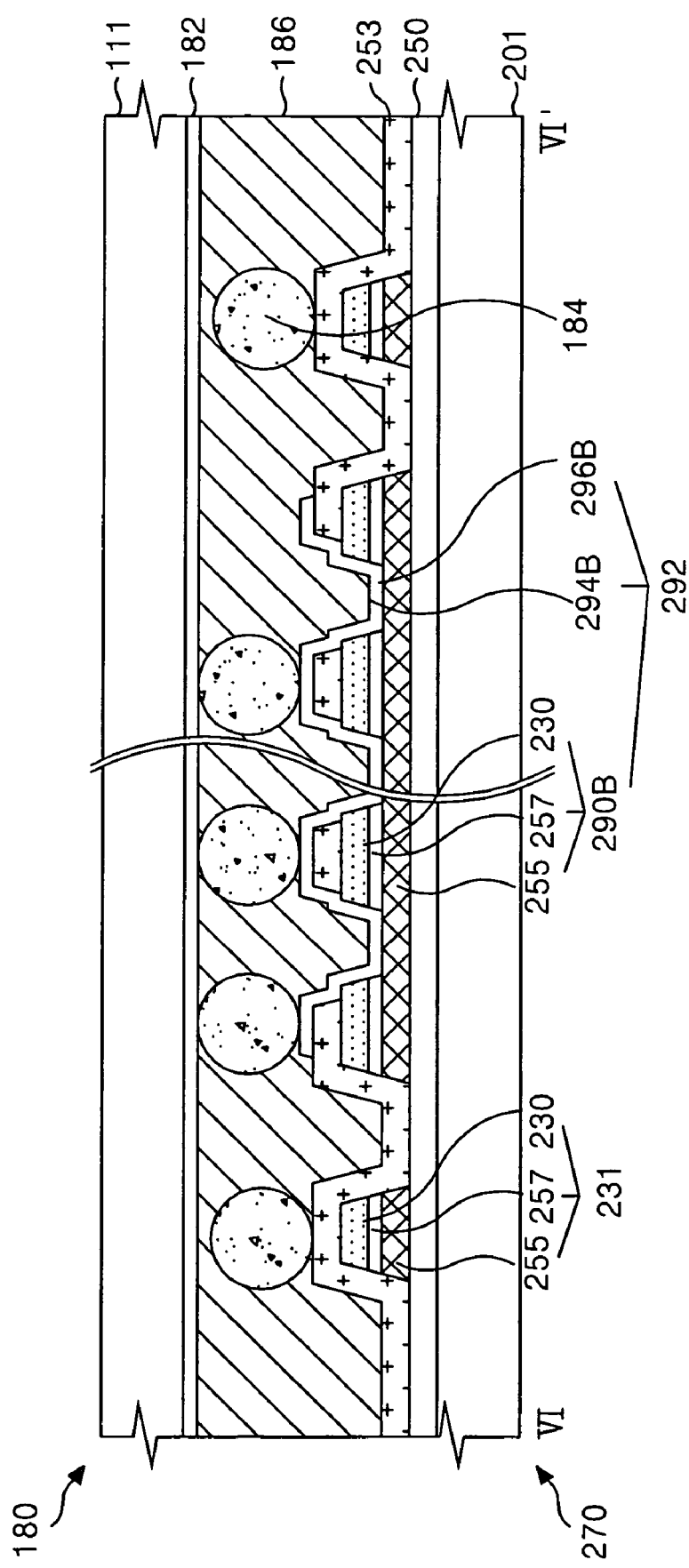

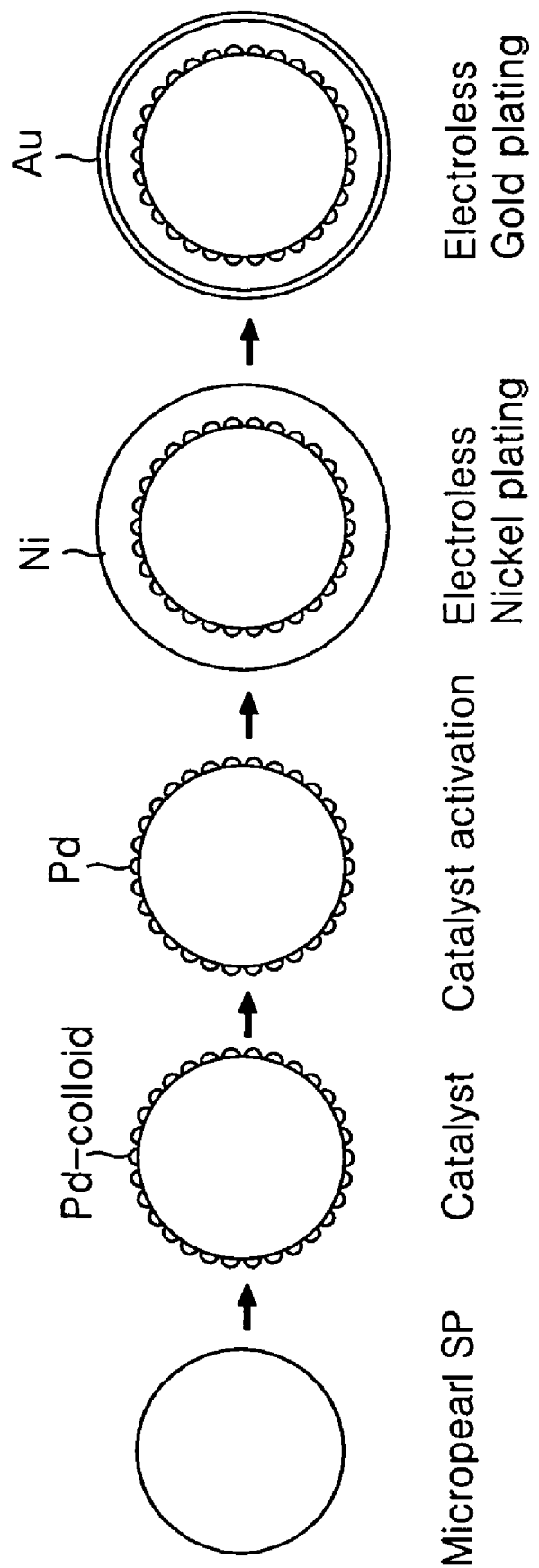

LIQUID CRYSTAL DISPLAY DEVICE AND METHOD OF FABRICATING THE SAME

This application claims the benefit of Korean Patent Application Nos. P2004-110885, filed on Dec. 23, 2004, and P2005-98755, filed on Oct. 19, 2005, which are hereby incorporated by reference for all purposes as if fully set forth herein.

BACKGROUND OF THE INVENTION

1. Field of the Invention

The present invention relates to a liquid crystal display device and a fabricating method thereof, and more particularly to a smaller liquid crystal display device with a shorter process time, and a fabricating method thereof.

2. Discussion of the Related Art

A liquid crystal display device controls the light transmittance of liquid crystal by use of an electric field, thereby displaying a picture. The liquid crystal display device, as shown in FIGS. 1 and 2, includes a thin film transistor array substrate 70 and a color filter array substrate 80 which are opposite to each other with a liquid crystal 50 in between.

The thin film transistor array substrate 70 includes: a gate line 2 and a data line 4 that cross each other on a lower substrate 1; a thin film transistor 30 formed where the gate line 2 crosses the data line 4; a pixel electrode 22 connected to the thin film transistor 30; and a lower alignment film spread thereover for aligning liquid crystal.

The color filter array substrate 80 includes: a black matrix 18 formed on an upper substrate 11 to prevent light leakage; a color filter 12 realizing color; a common electrode 14 that forms a vertical electric field with the pixel electrode 22; and an upper alignment film spread thereover for aligning liquid crystal.

A silver dot 10 is formed outside a sealant 16, as shown in FIG. 2, in order to apply a common voltage to the common electrode 14 of the color filter array substrate 80. The silver dot 10 is placed between the thin film transistor substrate 70 and the color filter substrate 80 95 a paste, and then the two substrates 70, 80 are bonded together by use of the sealant. The silver dot 10 spreads out to the adjacent area because of pressure applied to the substrates 1, 11 upon bonding them together. In order for the silver dot 10 to spread out to the adjacent area and not to be damaged by a scribing process, a relatively broad silver dot area is required inside a scribing line. Further, for a small liquid crystal display device, after forming a plurality of small panel areas on a mother substrate, a silver dot process is performed in all the panel areas, thus there is a problem in that the process is more complicated and requires more process time than a large liquid crystal display device.

SUMMARY OF THE INVENTION

Accordingly, the present invention is directed to liquid crystal display device and method of fabricating the same that substantially obviates one or more of the problems due to limitations and disadvantages of the related art.

An advantage of the present invention is to provide a liquid crystal display device that is small in size as well as decreasing the process time, and a fabricating method thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a liquid crystal display device according to an aspect of the present invention includes an upper substrate where a common electrode is formed; a lower substrate that faces the upper substrate; a plurality of gate drive integrated circuits that supplies a gate signal to a gate line that is located on the lower substrate; a plurality of data drive integrated circuits that supplies a data signal to a data line that is located on the lower substrate; a common line that supplies a common voltage to the common electrode through the gate drive integrated circuit and the data drive integrated circuit when driving a liquid crystal; and a conductive sealant that electrically connects the common electrode to the common line in one of an area of between adjacent gate drive integrated circuits and between adjacent data drive integrated circuits.

A liquid crystal display device according to another aspect of the present invention includes a common electrode on an upper substrate; a supply pattern that overlaps a signal line that is on a lower substrate that is opposite to the upper substrate with an insulating film of at least one layer therebetween to supply a common voltage to the common electrode; and a sealant including of a conductive spacer that bonds the upper substrate to the lower substrate and electrically connects the common electrode to the supply pattern.

A fabricating method of a liquid crystal display device according to still another aspect of the present invention includes providing an upper substrate where a common electrode is formed; providing a lower substrate to which a gate signal is supplied from a gate drive integrated circuit and a data signal is supplied from a data drive integrated circuit; bonding the upper substrate and the lower substrate by use of a conductive sealant, and wherein the step of providing the lower substrate includes forming a common line to supply a common voltage to the common electrode through the gate drive integrated circuit and the data drive integrated circuit when driving a liquid crystal; and electrically connecting the common electrode to the common line in one area between the adjacent gate drive integrated circuits and between the adjacent data drive integrated circuits by use of the conductive sealant.

A fabricating method of a liquid crystal display device according to still another aspect of the present invention includes providing an upper substrate where a common electrode is formed; providing a lower substrate where a common pattern is formed overlapping a signal line with an insulating film of at least one layer therebetween to supply a common voltage to the common electrode; and bonding together the upper substrate and the lower substrate using of a sealant including of a conductive spacer that electrically connects the common electrode to the common pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 9A to 9F are sectional diagrams representing a fabricating method of a thin film transistor array substrate shown in FIGS. 7 and 8.

FIG. 10 is a diagram representing a liquid crystal display device according to a third embodiment of the present invention;

FIGS. 11A and 11B are enlarged diagrams of an area B in FIG. 10;

FIGS. 12A and 12B are enlarged diagrams of an area C in FIG. 10;

FIG. 14 is a diagram representing a fabricating step of a conductive ball included in a conductive sealant shown in FIGS. 11B and 12B.

DETAILED DESCRIPTION OF THE ILLUSTRATED EMBODIMENT

Reference will now be made in detail to the embodiments of the present invention, examples of which are illustrated in the accompanying drawings.

With reference to FIGS. 3 to 14, embodiments of the present invention will be explained as follows.

Figure 1:
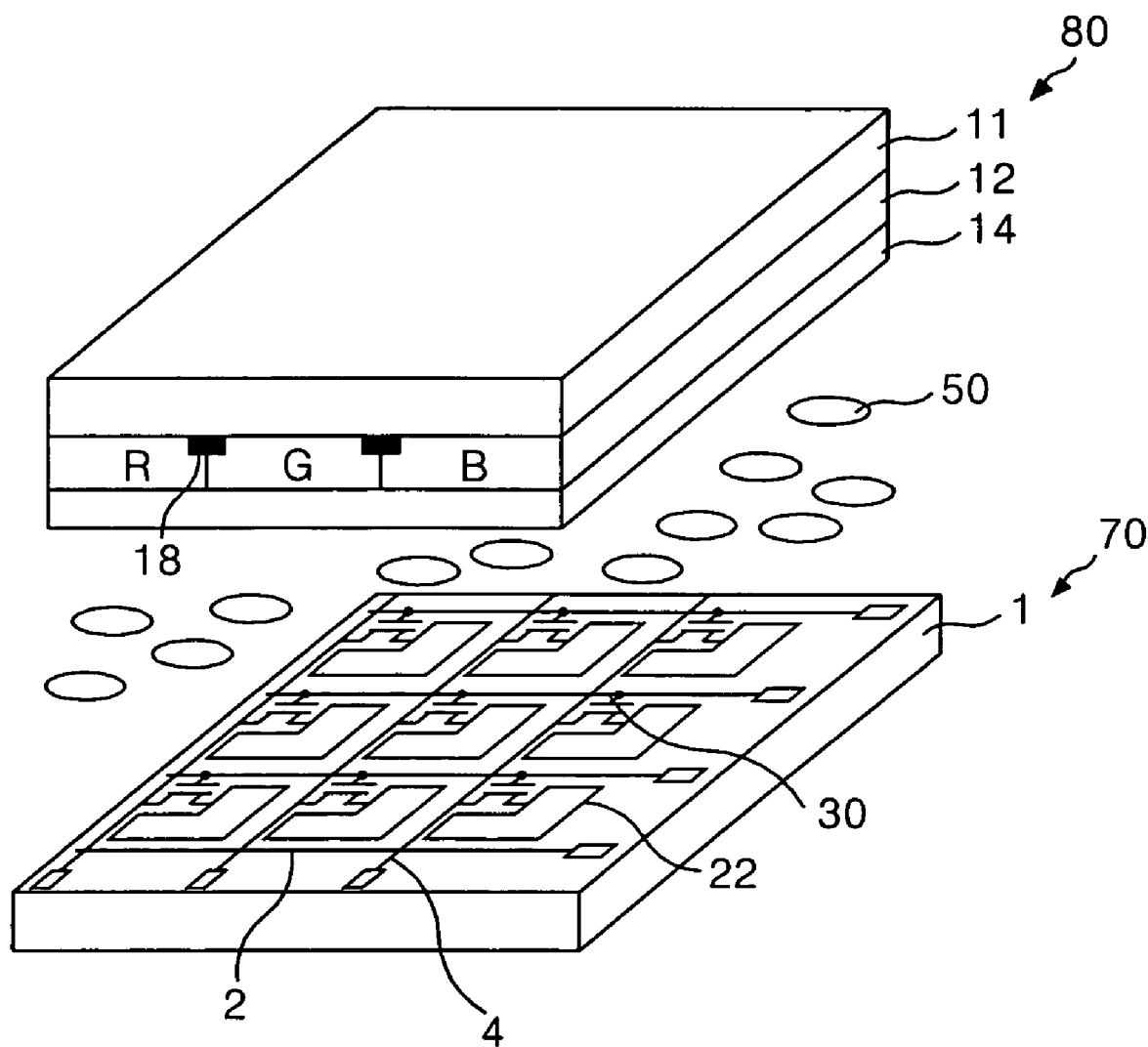
FIG. 1 is a plan view representing a liquid crystal display device of the related art.
Figure 2:
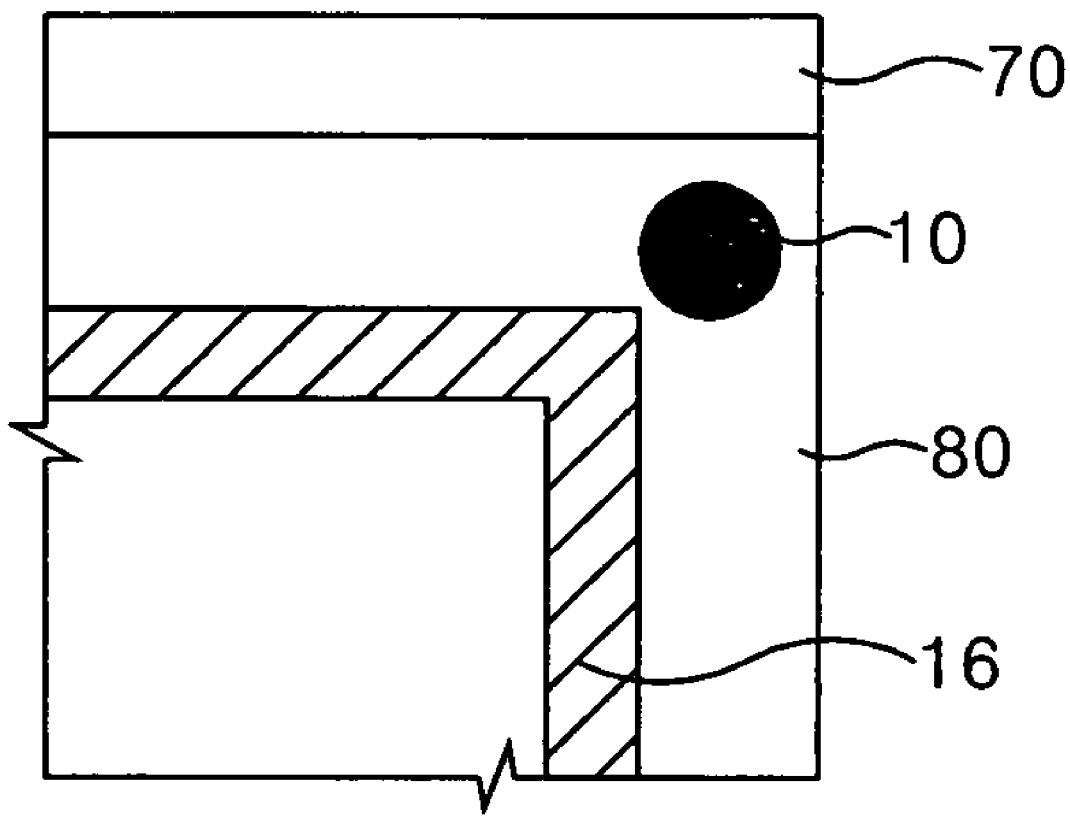
FIG. 2 is a plan view representing a silver dot for supplying a common voltage to a common electrode shown in FIG. 1.
Figure 3:
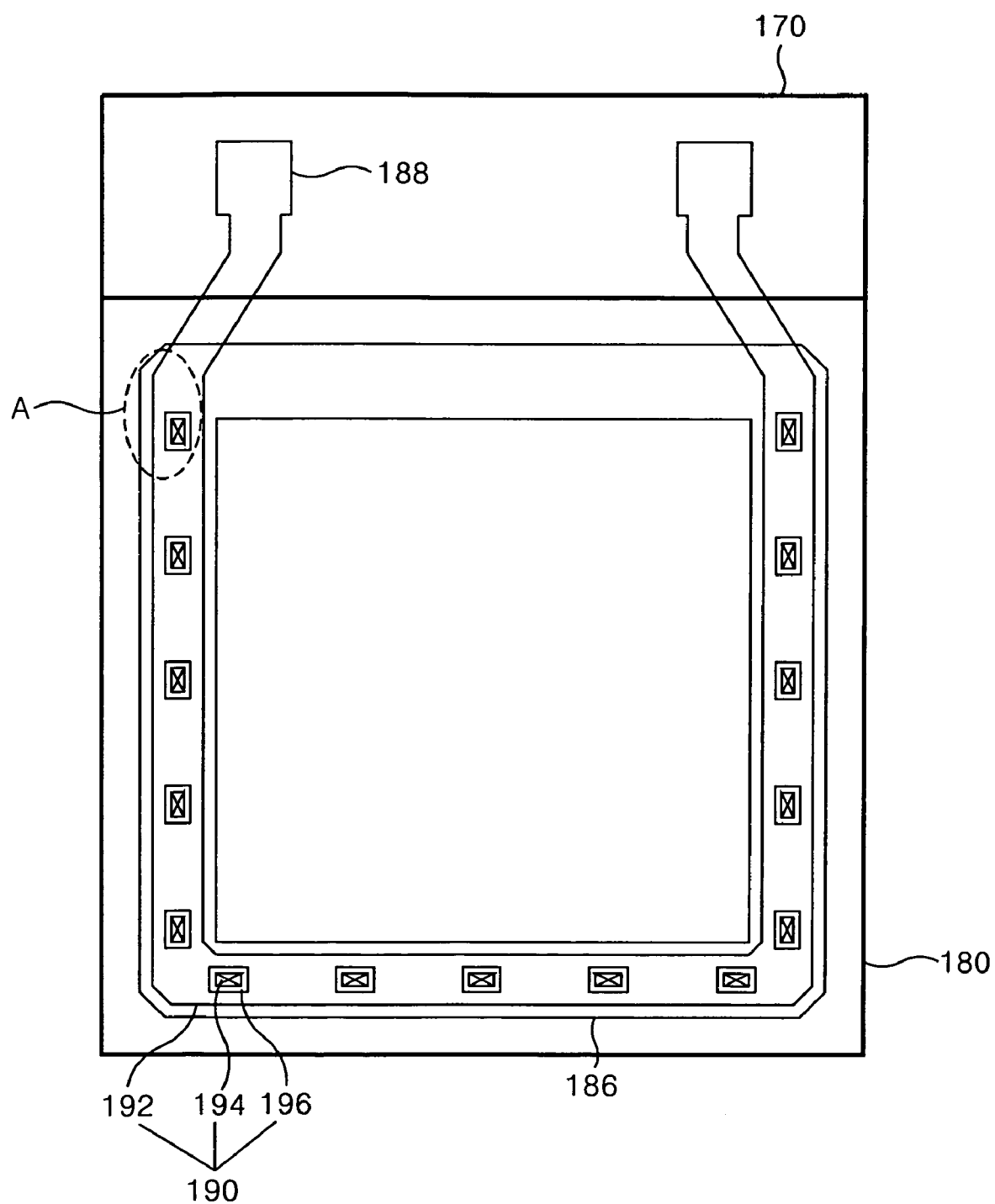
FIG. 3 is a plan view representing a liquid crystal display device according to a first embodiment of the present invention.

FIG. 3 is a plan view representing a liquid crystal display device according to a first embodiment of the present invention.

The liquid crystal display device shown in FIG. 3 includes: a thin film transistor substrate 170 where a thin film transistor array is formed; a color filter substrate 180 where a color filter array is formed; and a sealant 186 for bonding the thin film transistor substrate 170 and the color filter substrate 180 together.

The thin film transistor array substrate 170 has a thin film transistor array formed on a lower substrate, wherein the thin film transistor array includes a gate line and a data line crossing each other to define a pixel area; a thin film transistor formed at a crossing part thereof; a pixel electrode connected to the thin film transistor; a lower alignment film spread thereover for aligning liquid crystal.

Figure 5:
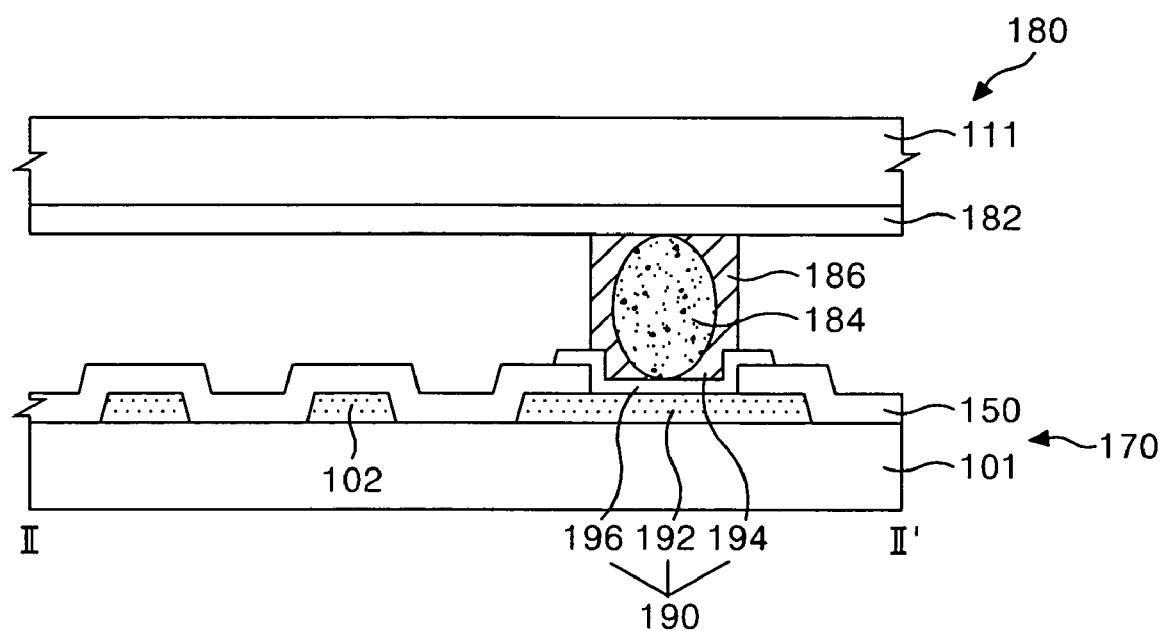
FIG. 5 is a sectional diagram representing the liquid crystal display device taken along the line II-II' of FIG. 4.

The color filter array substrate 180 has the color filter array formed on an upper substrate 111, as shown in FIG. 5, wherein the color filter array includes a black matrix for preventing light leakage; a color filter for realizing color; a common electrode 182 to generate a vertical electric field with the pixel electrode; an upper alignment film spread thereover for aligning liquid crystal.

Figure 4:
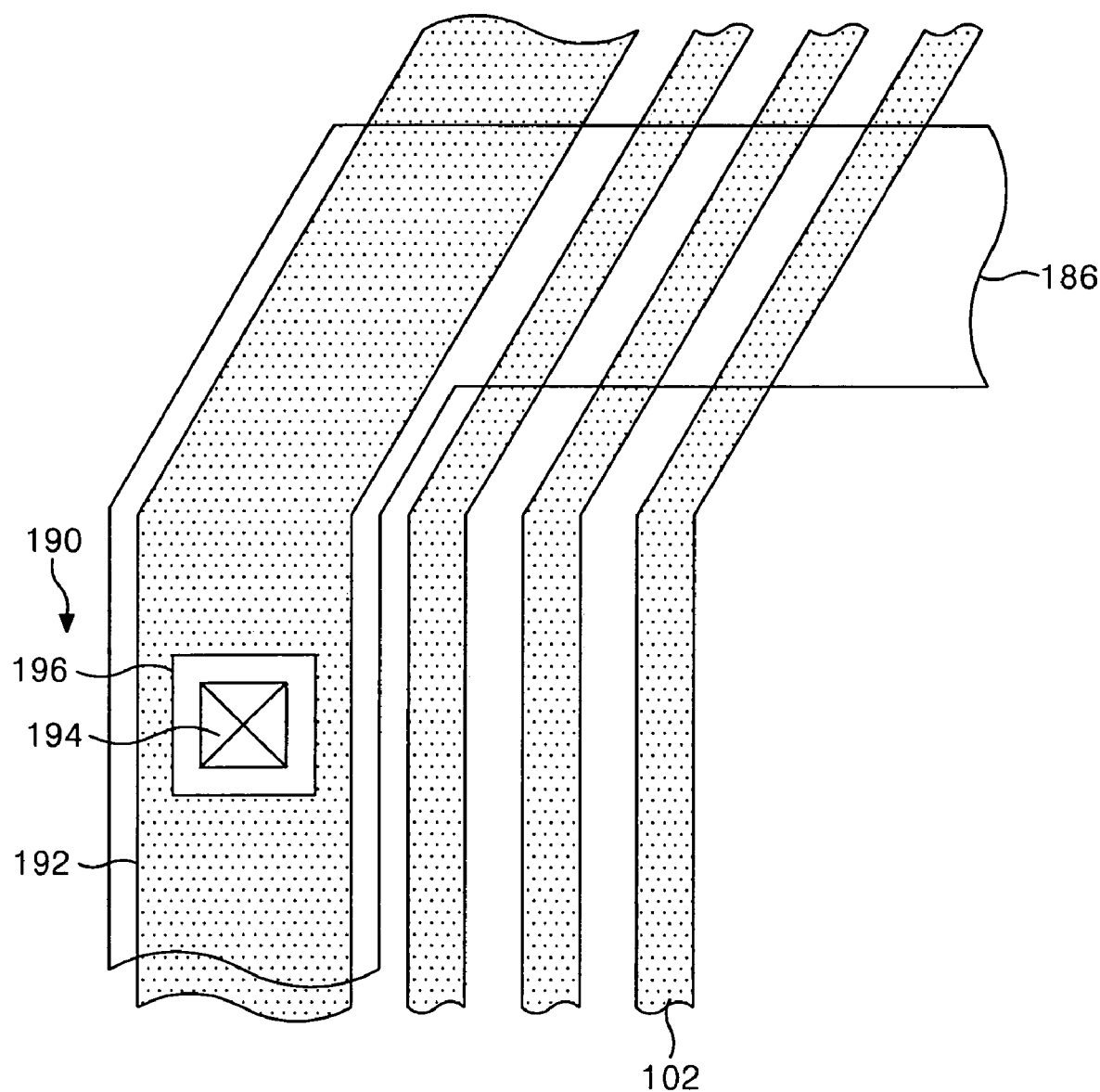
FIG. 4 is an enlarged plan view of an area A shown in FIG. 3.

A connecting part 190 connected to the common electrode 182 through the sealant 186 is formed on the lower substrate 101 in order to apply a common voltage to the common electrode 182. The connecting part 190, as shown in FIGS. 4 and 5, includes a first supply pattern 192 formed in an area which overlaps the sealant 186 along the sealant 186; a second supply pattern 196 connected to the first supply pattern 192 through a supply contact hole 194 which penetrates an insulating film 150 of at least one layer; and a conductive spacer 184 for connecting the second supply pattern 196 and the common electrode 182.

The first supply pattern 192 is formed of the same metal and on the same level as a gate link 102 which is connected to the gate line, thus the first supply pattern 192 is formed to be separated from the gate link 102 by a designated gap. The first supply pattern 192 is formed to extend from a supply pad 188 which is connected to a power supply (not shown).

The second supply pattern 196 is formed of the same material on the same level as the pixel electrode (not shown). The second supply pattern 196 is formed in a line in the same manner as the first supply pattern 192 that is formed in a line, or formed in a dot shape so as to partially overlap the first supply pattern 192.

The supply contact hole 194, in case of a transmissive liquid crystal display device, penetrates the insulating film 150 including a gate insulating film and a passivation film to expose the first supply pattern 192. In the case of a transflective liquid crystal display device, the supply contact hole 194 penetrates the insulating film 150 including at least one of the gate insulating film, the passivation film, and an organic film to expose the first supply pattern 192.

The conductive spacer 184 is formed of at least one of a conductive glass fiber and a conductive ball. Herein, the conductive ball is formed by coating a conductive material such as silver Ag, gold Au on the outer side of a ball spacer so as to be conductive. The conductive ball can fix the gap between the substrates even at a designated pressure differently from a conductive ball that is included in an anisotropic conductive film ACF.

The conductive spacer 184 is mixed with the sealant 186 to be spread over the substrate or the sealant 186 is spread over the substrate where the conductive spacer 184 is formed.

In this way, the liquid crystal display device according to the first embodiment of the present invention connects the common electrode formed on the upper substrate to the connecting part formed on the lower substrate by use of the sealant including the conductive spacer. In this case, a separate silver dotting process is not required and the manufacturing process is simplified.

On the other hand, the liquid crystal display device according to the first embodiment of the present invention has the first supply pattern 192 formed having a designated gap with the gate link 102 along the outer area of the substrate 101. The first supply pattern 192 causes a liquid crystal margin area, i.e., an area into which liquid crystal is injected but which is not included an active picture area, to increase, thus there is difficulty in that the substrate 101 is small size.

Figure 6:
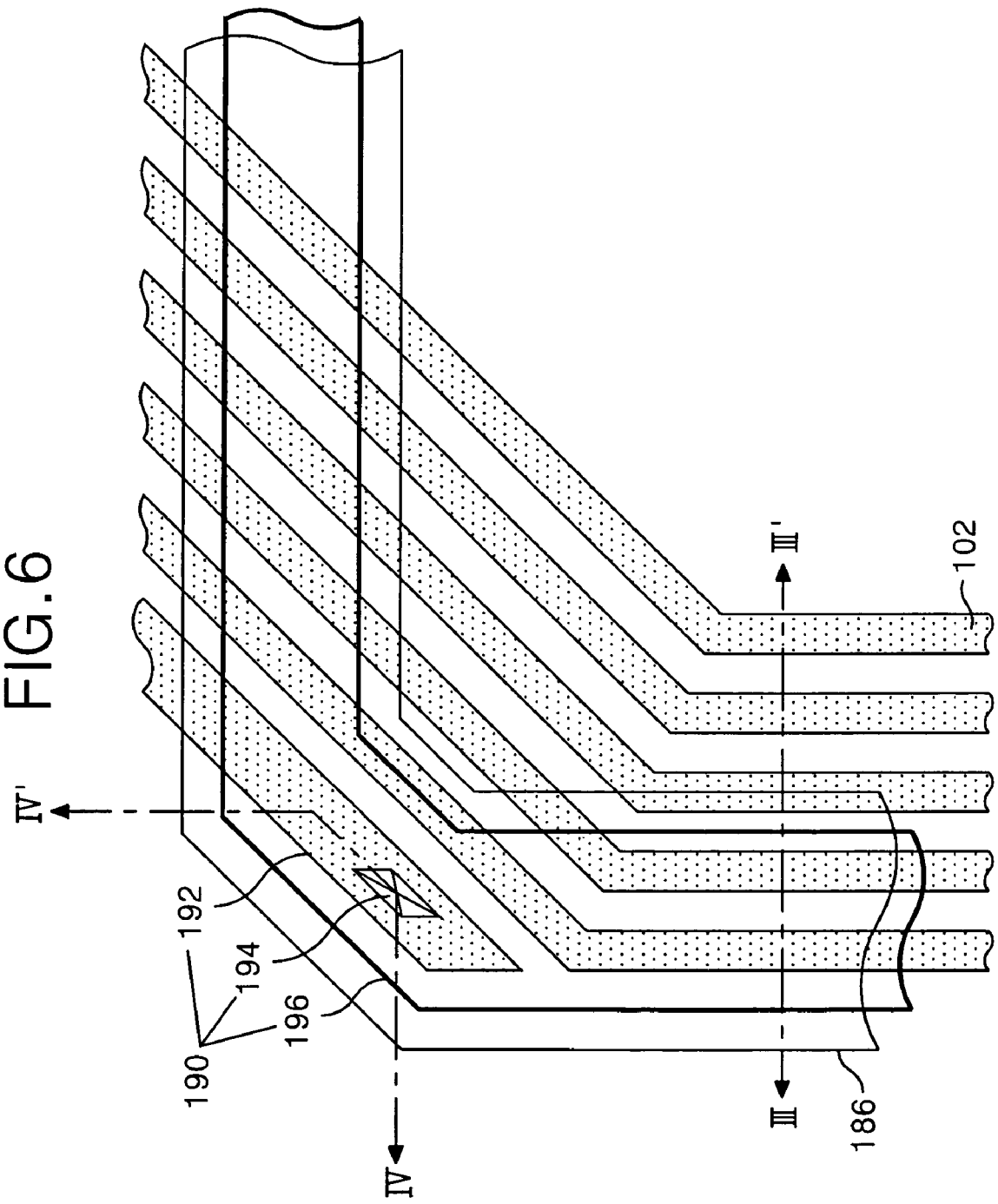
FIG. 6 is a plan view representing a liquid crystal display device according to a second embodiment of the present invention.
Figure 7:
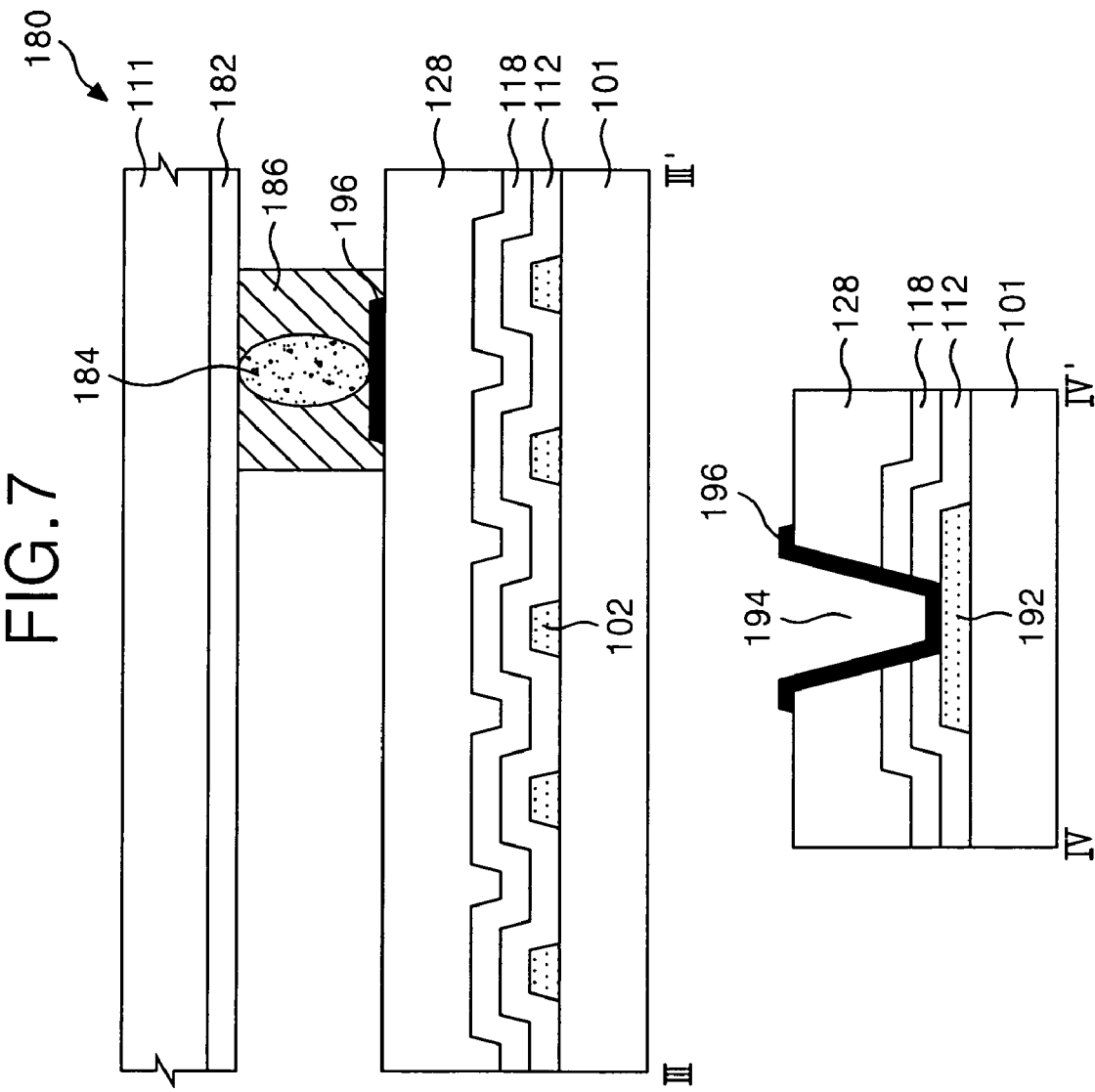
FIG. 7 is a sectional diagram representing the liquid crystal display device taken along the lines III-III', IV-IV' of FIG. 6.

FIG. 6 is a plan view representing a liquid crystal display device according to a second embodiment of the present invention, and FIG. 7 is a sectional diagram representing the liquid crystal display device along the lines III-III', IV-IV' of FIG. 6.

The liquid crystal display device shown in FIGS. 6 and 7 includes the same components as the liquid crystal display device shown in FIGS. 4 and 5 except that the connecting part 190 is formed to overlap the gate link 102. Accordingly, the detailed description for the same components will be omitted.

The connecting part 190 includes a first supply pattern 192; a second supply pattern 196 connected to the first supply pattern 192 through a supply contact hole 194 that penetrates an insulating film 150 of at least one layer; and a conductive spacer 184 for connecting the second supply pattern 196 to the common electrode 182.

The first supply pattern 192 is formed at one side of the substrate 101 to be adjacent to an inclined area of the last gate link 102 which is located at the outermost area of the substrate 101. The first supply pattern 192 is formed to extend from the supply pad 188 which is connected to a power supply (not shown).

The second supply pattern 196 is formed to overlap a sealant 186 along the sealant 186 to be connected to the first supply pattern 192 through the supply contact hole 194. Further, the second supply pattern 196 is formed to overlap the gate link 102 with the insulating film of at least one layer. Herein, the supply contact hole 194 is formed in an area which overlaps the sealant 186.

Figure 8:
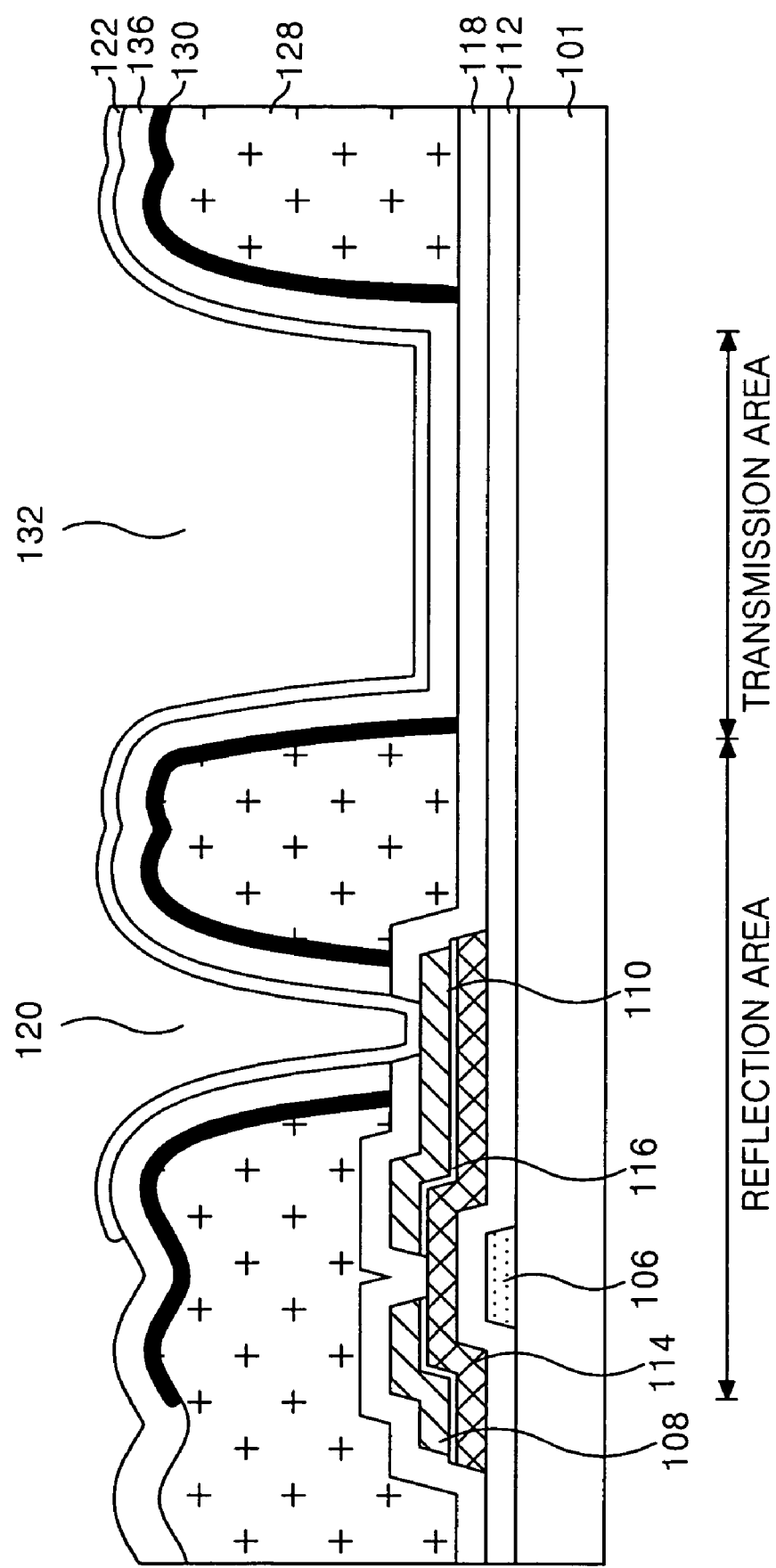
FIG. 8 is a sectional diagram representing a transflective liquid crystal display device having a reflection electrode which is formed at the same time as a second supply pattern.

The second supply pattern 196, in case of a transflective liquid crystal display device which is operated in reflection mode and transmission mode, is formed of the same material on the same level as a reflection electrode 130 shown in FIG. 8. In this case, the second supply pattern 196 is formed to overlap the first supply pattern 192 with a gate insulating film 112, a first passivation film 118, and an organic film 128. The supply contact hole 120 penetrates the gate insulating film 112, the passivation film 118, and the organic film 128 to expose the first supply pattern 110. On the other hand, the transflective liquid crystal display device displays picture in the reflection mode, i.e., the external light like a natural light is reflected in a reflection area where the reflection electrode is formed, if an external light is sufficient, and the transflective liquid crystal display device displays picture in the transmission mode, i.e., light incident from a backlight unit is used in a transmission area where the reflection electrode is nor formed, if the external light is not sufficient.

The second supply pattern 196, in case of a transmissive liquid crystal display device where a picture is displayed by use of light incident from the backlight unit, is formed of the same material on the same level as the pixel electrode 122 shown in FIG. 8. Further, the second supply pattern 196 is formed to overlap the first supply pattern 192 with the gate insulating film 112 and the passivation film 118. The supply contact hole 194 penetrates the gate insulating film 112 and the passivation film 118 to expose the first supply pattern 192.

The conductive spacer 184 is formed of a conductive glass fiber or a conductive ball. The conductive spacer 184 is mixed with the sealant 184 to be spread over the substrate, or the sealant 186 is spread over the substrate where the conductive spacer 184 is formed.

In this way, the liquid crystal display device according to the second embodiment of the present invention has the connecting part formed to overlap the sealant area and the gate link. In this case, the common electrode and the connecting part is connected by use of the conductive spacer included in the sealant, thus no separate silver dotting process is required and the process is simplified. Further, the supply pattern included in the connecting part is formed to overlap the gate link, thus the liquid crystal margin area can be decreased by the width of the supply pattern, thereby enabling to make the liquid crystal display device to be small in size.

On the other hand, a thin film transistor array substrate of the transflective liquid crystal display device shown in FIG. 8 includes a gate line and a data line which define a pixel area; a thin film transistor connected to the gate line and the data line; a pixel electrode 122 formed in the pixel area to be connected to the thin film transistor; and a reflection electrode 130 formed in a reflection area of the pixel area.

The thin film transistor selectively supplies a data signal from the data line to the pixel electrode 122 in response to a gate signal from the gate line. For this, the thin film transistor includes a gate electrode 106 connected to the gate line; a source electrode 108 connected to the data line; a drain electrode 110 connected to the pixel electrode 122; an active layer 114 which overlaps the gate electrode 106 with a gate insulating film 112 therebetween and forms a channel between the source electrode 108 and the drain electrode 110; and an ohmic contact layer 116 for providing an ohmic-contact between the source electrode 108, and the drain electrode 110 and active layer 114.

The pixel electrode 122 is formed in the pixel area that is defined by the crossing of the data line 104 and the gate line 102, and the pixel electrode 122 is connected to the drain electrode 110. The pixel electrode 122 generates a potential difference with the common electrode (not shown) by the data signal applied by the thin film transistor. The potential difference causes the liquid crystals to rotate, thus the light transmittance is determined by the degree of rotation of the liquid crystal in each of the reflection area and the transmission area.

The reflection electrode 130 reflects the external light passing through the color filter substrate (not shown) to the color filter substrate. The reflection electrode 130 has an embossed shape along the organic film 128 that is formed to have an embossed surface, thereby increasing the reflection efficiency by dispersing the light. The area where the reflection electrode 130 is formed is a reflection area in each pixel area, and an area where the reflection electrode 130 is not formed is a transmission area in each pixel area.

A transmission hole 132 is formed that penetrates the organic film 128 in the transmission area so that the path length of the light which passes through the liquid crystal layer in the reflection area and the transmission area are equal. As a result, the reflected light incident on the reflection area is reflected at the reflection electrode 130 through the liquid crystal layer and emitted to the outside through the liquid crystal layer. The transmitted light of the backlight unit (not shown) being incident on the transmission area is transmitted through the liquid crystal layer to be emitted to the outside. Accordingly, the length of the light path is the same in the reflection area and the transmission area, thus the transmission efficiency of the reflection mode of the liquid crystal display device become the same as that of the transmission mode of the liquid crystal display device.

FIGS. 9A to 9F are sectional diagrams representing a fabricating method of a transflective thin film transistor array substrate according to the present invention.

Referring to FIG. 9A, a first conductive pattern group is formed including the gate link 102, the gate electrode 106, and the first supply pattern 192 on the lower substrate 101.

A gate metal layer is formed on the lower substrate 101 by a deposition method such as sputtering. The gate metal layer is patterned by a photolithography process and an etching process to form the first pattern group including the gate link 102, the gate electrode 106 and the first supply pattern 192. The gate metal layer is a single or multiple layer structure of metal such as Al, Mo, Cr, Cu, Al alloy, Mo alloy, Cr alloy or Cu alloy.

Figure 9B:
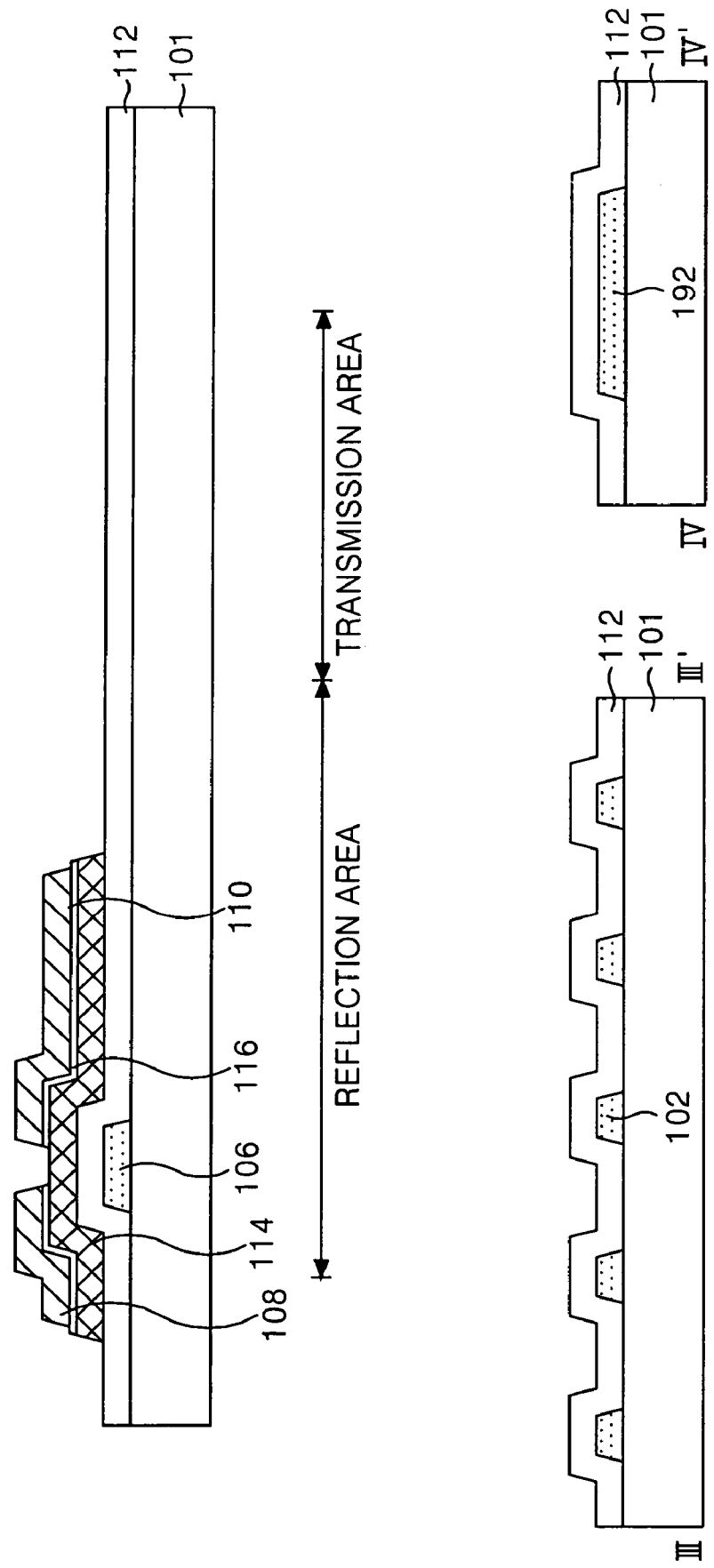

Referring to FIG. 9B, the gate insulating film 112 is formed on the lower substrate 101 where the first conductive pattern group is formed. Next, a semiconductor pattern including the active layer and the ohmic contact layer, and a second conductive pattern group including the data line 104, the source electrode 108 and the drain electrode 110 are formed thereon.

The gate insulating film 112, an amorphous silicon layer, an amorphous silicon layer doped with impurities, and a source/drain metal layer are sequentially formed on the lower substrate 101 where the first conductive pattern group is formed, by a deposition method such as PECVD and sputtering. The gate insulating film 112 may be formed of an inorganic insulating material such as silicon oxide SiOx or silicon nitride SiNx, and the source/drain metal layer may be formed in a single or double layer structure of metal such as Al, Mo, Cr, Cu, Al alloy, Mo alloy, Cr alloy or Cu alloy.

A photo-resist pattern is formed where a channel area on the source/drain metal layer has a lower height than the photo-resist pattern over the source/drain area. The source/drain metal layer is patterned by a wet etching process using the photo-resist pattern, thereby forming the second conductive pattern group including the data line 104, the source electrode 108, and the drain electrode 110 that is integrated with the source electrode 108.

Then, the amorphous silicon layer doped with impurities and the amorphous silicon layer are simultaneously patterned by a dry etching process using the same photo-resist pattern, thereby forming the ohmic contact layer 116 and the active layer 114.

After the photo-resist pattern having a lower height in the channel area is removed by an ashing process, the ohmic contact layer 116 and the source/drain pattern of the channel area are etched by a dry etching process. Accordingly, the active layer 114 of the channel part is exposed and the source electrode 108 and the drain electrode are separated from each other.

Subsequently, the photo-resist pattern remaining on the second conductive pattern group is removed by a stripping process.

Referring to FIG. 9C, a first passivation film 118 is formed on the substrate 101 where the second conductive pattern group is formed, and an organic film 128 is formed thereon, wherein the organic film 128 has a hole 134 and a transmission hole 132 and has an embossed surface.

The first passivation film 118 and the organic film 128 are sequentially formed on the gate insulating film 112 where the second conductive pattern group is formed. The first passivation film 118 may be formed of an inorganic insulating material such as the gate insulating film 112, and the organic film 128 may be formed of an organic insulating material such as acrylic resin.

Then, the organic film 128 is patterned by a photolithography process, thereby forming the hole 134 and the transmission hole 132. At this moment, a mask for forming the organic film 128 has a structure where a shielding area and a diffraction exposure area are repeated in the remaining area except the transmission area corresponding to the transmission hole. Accordingly, the organic film 128 is patterned in a structure where a shielding area (projections) and a diffraction exposure area (grooves) having a step shape are repeated. Subsequently, the organic film 128 where the projections and the grooves are repeated is fired, thereby smoothing the step edges and forming the embossed shape on the surface of the organic film 128. Especially, the organic film 128 is formed so that an area where the pixel area is in contact with the sealant has the embossed shape.

On the other hand, the open hole 134 and the transmission hole 132 may be formed to penetrate the gate insulating film 112, the first passivation film 118, and the organic film 128 in the same manner as the supply contact hole 194.

Referring to FIG. 9D, a third conductive pattern group is formed including refection electrode 130 and the second supply pattern 196 on the organic film 128 with the embossed shape.

A reflection metal layer takes on embossed shape and is deposited on the organic film 128. The reflection metal layer may be formed of a metal having high reflexibility, such as Al or AlNd. Subsequently, the reflection metal layer is patterned by a photolithography process and on etching process, thereby forming the third conductive pattern group: including the reflection electrode 130 and the second supply pattern 196.

Referring to FIG. 9E, a second passivation film 136 having the contact hole 120 is formed on the organic film 128 where the third conductive pattern group is formed. It is also possible that the second passivation film 136 is omitted.

The second passivation film is formed on the organic film where the third conductive pattern group is formed. The second passivation film 136 may be formed of an inorganic insulating material such as the first passivation film 118. Then, the second passivation film 136 is patterned by a photolithography process and an etching process to form the contact hole 120. The contact hole 120 exposes the drain electrode 110 of the thin film transistor.

Referring to FIG. 9F, a fourth conductive pattern group is formed including the pixel electrode 122 on the second passivation film 136.

A transparent conductive layer is formed on the entire surface of the second passivation film 136. Indium tin oxide ITO, tin oxide TO, indium zinc oxide IZO and indium tin zinc oxide ITZO may be used for the transparent conductive layer. The transparent conductive layer is patterned by a photolithography process and an etching process, thereby forming the fourth conductive pattern group including of the pixel electrode 122.

FIG. 10 is a diagram representing a liquid crystal display device according to a third embodiment of the present invention.

The liquid crystal display device shown in FIG. 10 includes: a thin film transistor substrate 270 where a thin film transistor array is formed; a color filter substrate 180 where a color filter array is formed; and a conductive sealant 186 for bonding the thin film transistor substrate 270 and the color filter substrate 180 together.

The thin film transistor array substrate 270 includes: a gate line 220 and a data line 230 crossing each other to define a pixel cell; a thin film transistor formed at each crossing area; a pixel electrode connected to the thin film transistor; and a lower alignment film spread thereover for aligning the liquid crystal.

Further, the gate line 220 is electrically connected to a gate drive integrated circuit (hereinafter, referred to as "D-IC") 223 that drives the gate lines 220. The gate line 220 and the gate D-IC are connected by a gate link 221 which extends from the gate line 220. The data line 230 is electrically connected to a data drive integrated circuit (hereinafter, referred to as "D-IC") 233 that drives the data lines 230. The data line 230 and the data D-IC are connected by a data link 231 which extends from the data line 230.

In reference to FIGS. 11B or 12B to be described later, on the color filter array substrate 180 a color filter array is formed including: a black matrix for preventing light leakage; a color filter for realizing color; a common electrode 182 forming a vertical electric field with the pixel electrode; and an upper alignment film which is spread thereover for aligning liquid crystal.

Connecting parts 291, 292, 291A, 292A connected to the common electrode 182 through the conductive sealant 186 is formed on the lower substrate in order to apply a common voltage to the common electrode 182. The connecting parts 291,292, 291A, 292A, as shown in FIG. 10 may be formed in at least any one area of the adjacent gate D-IC's 223 and data D-IC's 233.

On the other hand, the thin film transistor array substrate 270 is divided into an array area where a plurality of pixel cells are located and a non-array area that encompasses the array area. The connecting parts 291, 292, 291A, 292A formed in the thin film transistor array substrate 270 may extend into the non-array area in the opposite direction to the data D-IC 233 or the gate D-IC 223 with the array area therebetween.

Further, the connecting parts 291, 292, 291A, 292A may be formed to be divided into a first connecting part 291 connected to the gate D-IC 223 and a second connecting part 292 connected to the data D-IC 233. The first connecting part 291 may be formed of the same components as the connecting part 291A that is located on the opposite side with the array area therebetween, and the second connecting part 292 may be formed of the same components as the connecting part 292A that is located on the opposite side with the array area therebetween. The description for the components of the connecting parts 291, 292, 291A, 292A will be made later in FIGS. 11A to 12B.

The foregoing connecting parts 291, 292, 291A, 292A are electrically connected to the gate D-IC 223 and the data D-IC 233 that are electrically connected to a signal line 261 that is connected to a power supply 260 which applies a common voltage, thereby receiving the common voltage.

The present invention includes the connecting parts 291A, 292A that extend from the data D-IC 233 and the gate D-IC 223, thereby making it possible to increase the number of points that are electrically connected to the common electrode 180. The first and second connecting parts 291, 292 may be disposed at the outer part of the gate links 221 and data links 231 that are connected to one gate D-IC 223 and one data D-IC 233. A space between the link 221, 231 connected to the outer part of one D-IC 223, 233 and the link 221, 231 connected to the outer part of the adjacent D-IC 223, 233 thereof is larger than a space between the links 221, 231. If a process of forming the connecting parts 291, 292 is performed in a spacious area, it is possible to prevent a phenomenon where a short-circuit is generated between the lines, thereby improving the reliability of the process.

In this way, the connecting parts 291, 292, 291A, 292A are formed between the adjacent gate D-IC's 223 and data D-IC's 233 in various ways and receive the common voltage supplied through the power supply 260 through the signal line 261, the gate D-IC 223, and the data D-IC 233. The common voltage supplied to the connecting parts 291, 292, 291A, 292A is transmitted to the common electrode 182 which overlaps the conductive sealant 186.

Figure 11B:
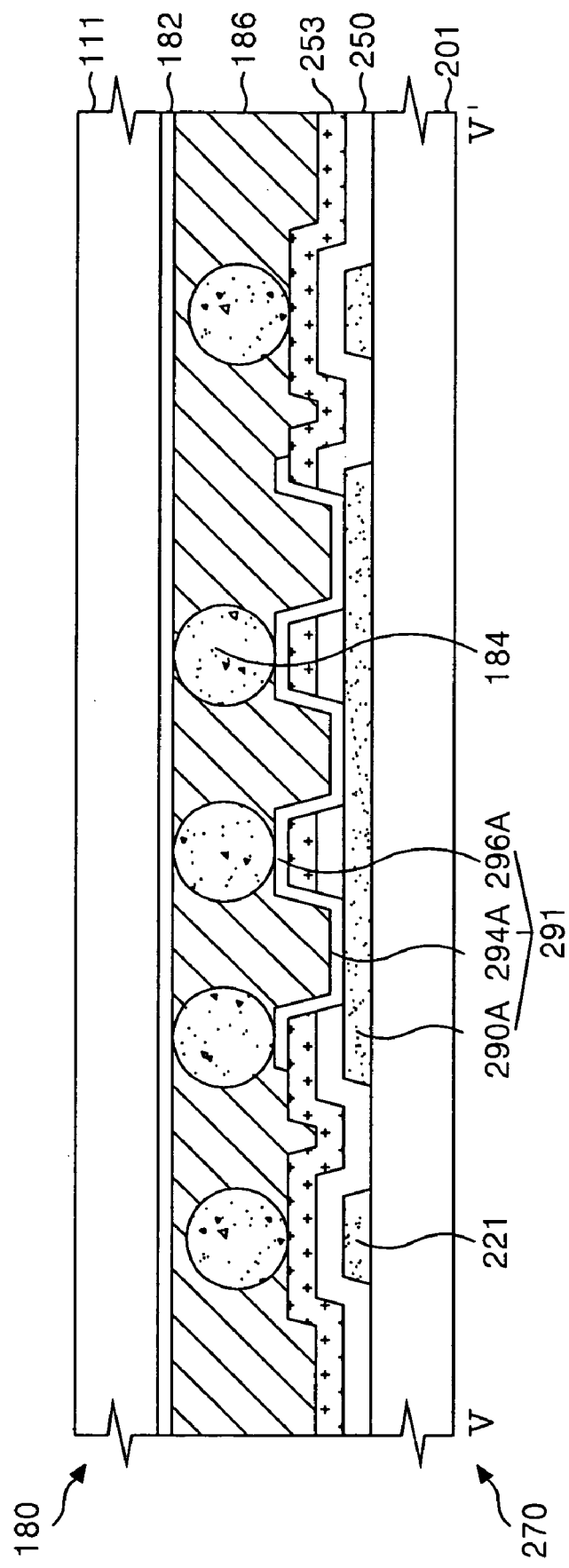

FIGS. 11A and 11B are enlarged diagrams of an area B that illustrate a part of the first connecting part 291 connected to the gate D-IC 223 in FIG. 10.

The first connecting part 291, as shown in FIGS. 11A and 11B, includes a first common line 290A formed in an area that overlaps the sealant 186 along the sealant 186; a first supply contact hole 294A that penetrates a gate insulating film 250 and a passivation film 253 to expose the first common line 290A; a first conductive pattern 296A connected to the first common line 290A through the first supply contact hole 294A; and a conductive spacer 184 for connecting the first conductive pattern 296A to the common electrode 182.

The first common line 290A is formed in the same plane of the same metal as the gate link 221 connected to the gate line, thus the first common line 290A is formed to be separated from the gate link 221 with a designated gap therebetween. One side of the first common line 290A is connected to the gate D-IC 223, and the other side of the first common line 290A is connected to the gate D-IC 223 which is adjacent to the gate D-IC 223 connected to the one side of the first common line 290A.

The first conductive pattern 296A is formed of the same material as the pixel electrode at the same time. The first conductive pattern 296A is formed in a line along the first common line 290A that is formed in a line, or the first conductive pattern 296A is formed in a dot shape to partially overlap the first common line 290A.

Further, the first conductive pattern 296A is formed in an area that is not overlapped with the gate link 221. The reason for forming the first conductive pattern 296A in an area that is not overlapped with the gate link 221 is to prevent a phenomenon where the first conductive pattern 296A is short-circuited with the gate link 221 while performing the fabricating process.

At least one of the first supply contact holes 294A is formed, and the first supply contact hole penetrates the gate insulating film 250 and the passivation film 253 to expose the first common line 290A. The first common line 290A exposed through the first supply contact hole 294A is in contact with the first conductive pattern 296A.

The connecting part 291A located on the opposite side of the fist connecting part 291 described in FIG. 10 with the array area therebetween may be formed of the same components (the first common line, the first conductive layer, the first supply contact hole) as the first connecting part 291. Further, an area where the connecting part 291A is electrically in contact with the conductive sealant 186 can be formed to be symmetric to a part where the first connecting part 291 is electrically in contact with the conductive sealant 186.

Figure 12A:
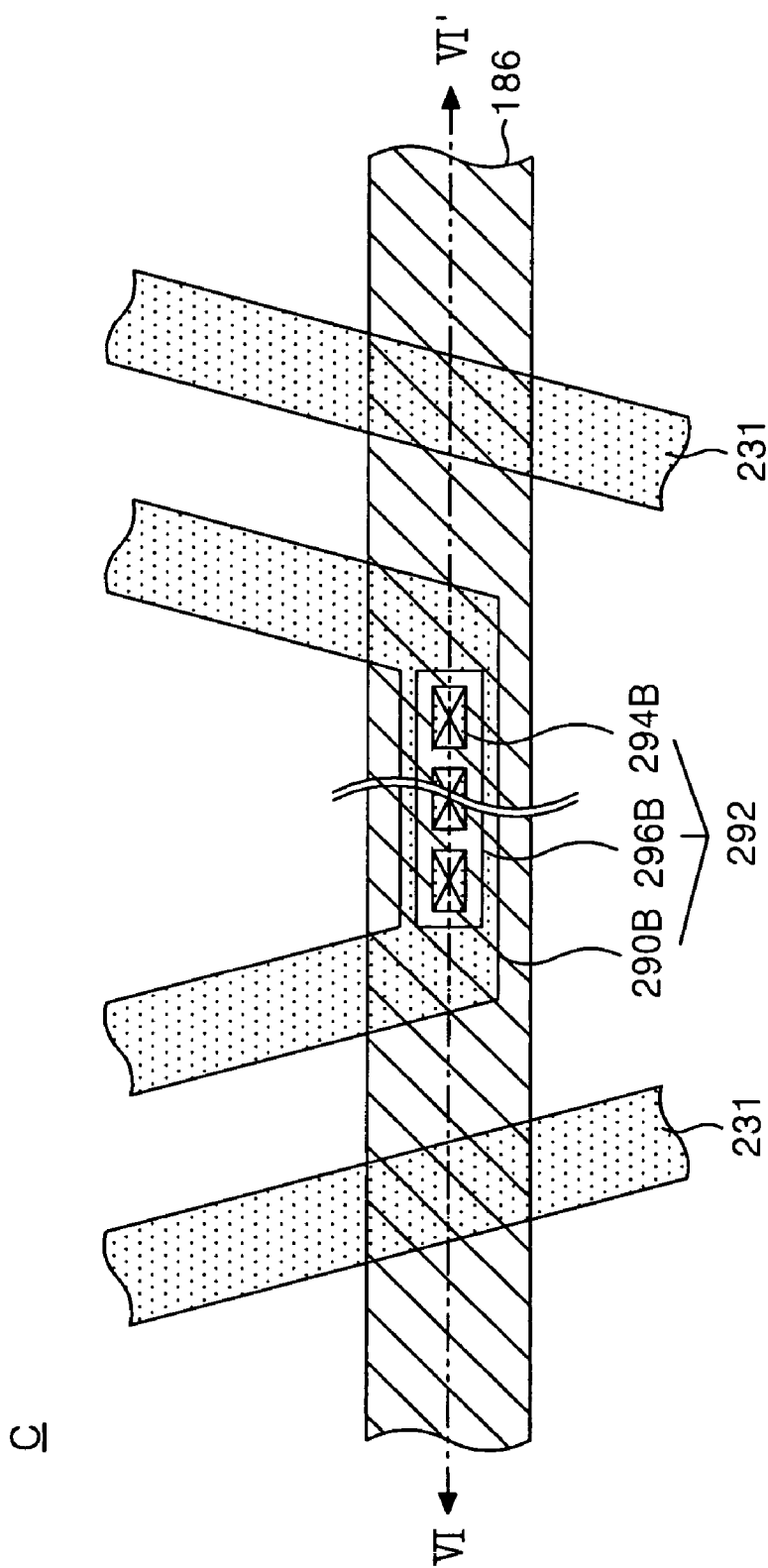

FIGS. 12A and 12B are enlarged diagrams of an area C illustrating a part of a second connecting part 292 connected to the data D-IC 233 in FIG. 10.

The second connecting part 292, as shown in FIGS. 12A and 12B, includes a second common line 290B formed in an area that overlaps the sealant 186 along the sealant 186; a second supply contact hole 294B that penetrates the passivation film 253 to expose the second common line 290B; a second conductive pattern 296B connected to the second common line 290B through the second supply contact hole 294B; and a conductive spacer 184 for connecting the second conductive pattern 296B to the common electrode 182.

The second common line 290B is formed in the same plane of the same metal as the data link 231 connected to the data line, thus the second common line 290B is formed to be separated from the data link 231 with a designated gap therebetween. One side of the second common line 290B is connected to the data D-IC 233, and the other side of the second common line 290B is connected to the data D-IC 233 which is adjacent to the data D-IC 233 connected to the one side of the second common line 290B.

The data link 231 connected to the data line and the second common line 290B is formed of a semiconductor pattern inclusive of an active layer 255 and an ohmic contact layer 257 and a data metal pattern 230 of an upper part of the semiconductor pattern.

The second conductive pattern 296B is formed of the same material as the pixel electrode at the same time. The second conductive pattern 296B is formed in a line along the second common line 290B that is formed in a line, or the second conductive pattern 296B may be formed in a dot shape to partially overlap the second common line 290B.

Further, the second conductive pattern 296B is formed in an area that is not overlapped with the data link 231. The reason for forming the second conductive pattern 296B in an area that is not overlapped with the data link 231 is to prevent the second conductive pattern 296B from being short-circuited with the data link 231 while performing the fabricating process.

At least one of the second supply contact holes 294B is formed, and the second supply contact hole penetrates the passivation film 253, the data metal pattern 230 and the ohmic contact layer 257 to expose a part of the second common line 290B. The second supply contact hole 294B may also be formed by penetrating the passivation film 253 to expose an upper part of the data metal pattern 230 of the second common line 290B.

The second common line 290B exposed through the second supply contact hole 294 is in contact with the second conductive pattern 296B.

The connecting part 292A located on the opposite side of the second connecting part 292 described in FIG. 10 with the array area therebetween may be formed of the same components (the second common line, the second conductive layer, the second supply contact hole) as the second connecting part 292. Further, a part where the connecting part 292A is electrically in contact with the conductive sealant 186 may be formed to be symmetric to a part where the second connecting part 292 is electrically in contact with the conductive sealant 186.

The conductive spacer 184 of FIGS. 11A to 12B may be made of a conductive glass fiber and a conductive ball.

The conductive spacer 184 is mixed with the sealant 186 to be spread over the substrate or the sealant 186 is spread over the substrate where the conductive spacer 184 is formed.

The liquid crystal display device according to the third embodiment of the present invention connects the common electrode formed on the upper substrate to the connecting part formed on the lower substrate by use of the sealant including the conductive spacer. Further, the liquid crystal display device according to the third embodiment of the present invention increases the points through which the common voltage is supplied to the color filter substrate by way of changing the pattern formed in the thin film transistor substrate, thereby making it possible to supply the common voltage in a more stable manner than when supplying the common voltage to the color filter substrate through silver dots. Because the common voltage is stably supplied to the color filter substrate, the liquid crystal display device according to the third embodiment of the present invention may improve defects such as a greenish, residual image, etc.

FIGS. 13A to 13D are diagrams representing a fabricating method of a thin film transistor array substrate of a liquid crystal display device according to the third embodiment of the present invention.

Figure 13A:
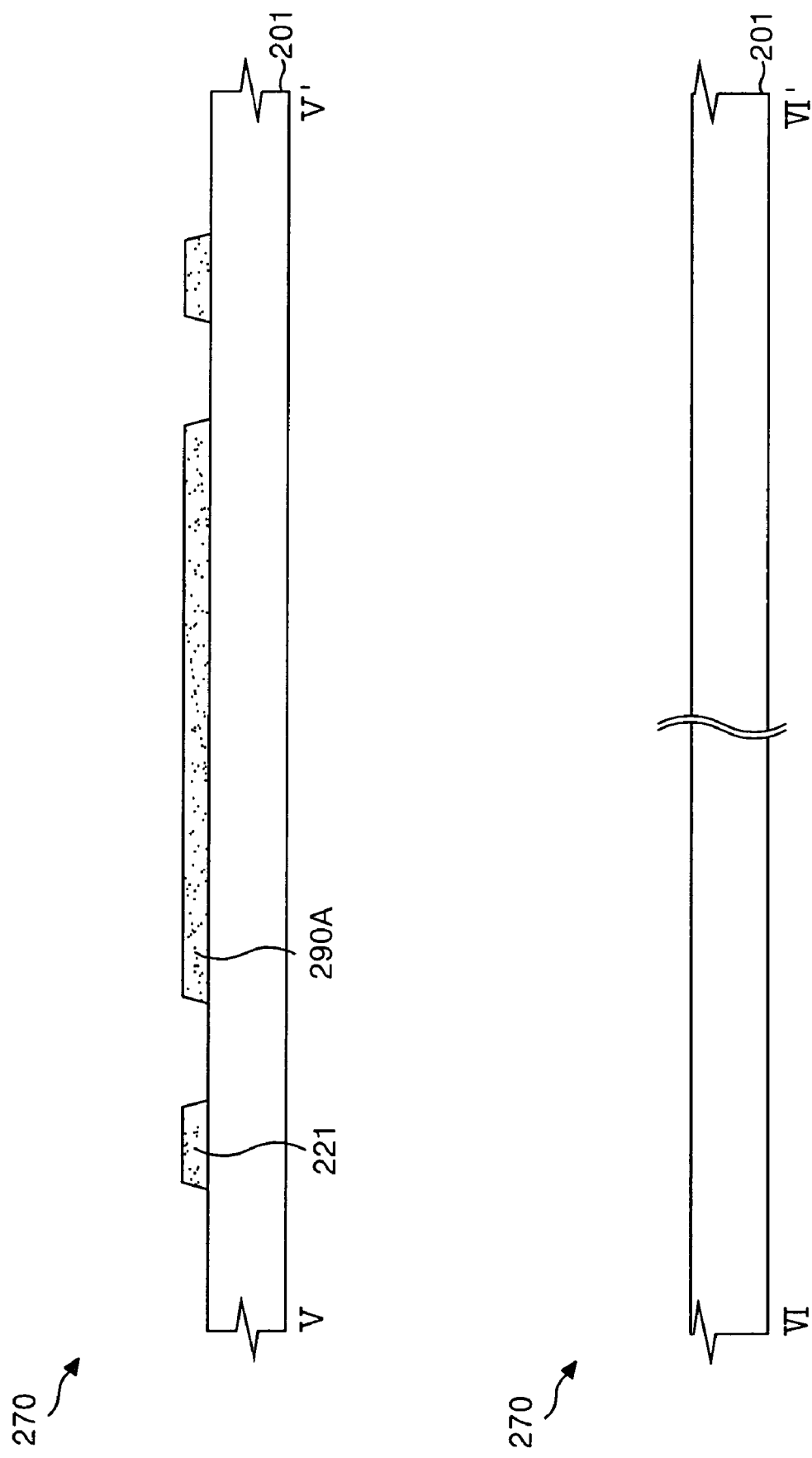
FIGS. 13A to 13D are diagrams representing a fabricating method of a liquid crystal display device according to the third embodiment of the present invention.

Referring to FIG. 13A, a first conductive pattern group inclusive of the gate link 221 and the first common line 290A is formed on a lower substrate 201.

To describe a process of forming the first conductive pattern group in detail, a gate metal layer is formed on the lower substrate 201 by a deposition method such as sputtering. The gate metal layer is patterned by a photolithography process and an etching process, thereby forming the first conductive pattern group including the gate link 221 and the first common line 290A. Herein, the gate metal layer may be formed in a single or multiple layer structure of metal such as Al, Mo, Cr, Cu, Al alloy, Mo alloy, Cr alloy, Cu ally, etc.

Figure 13B:
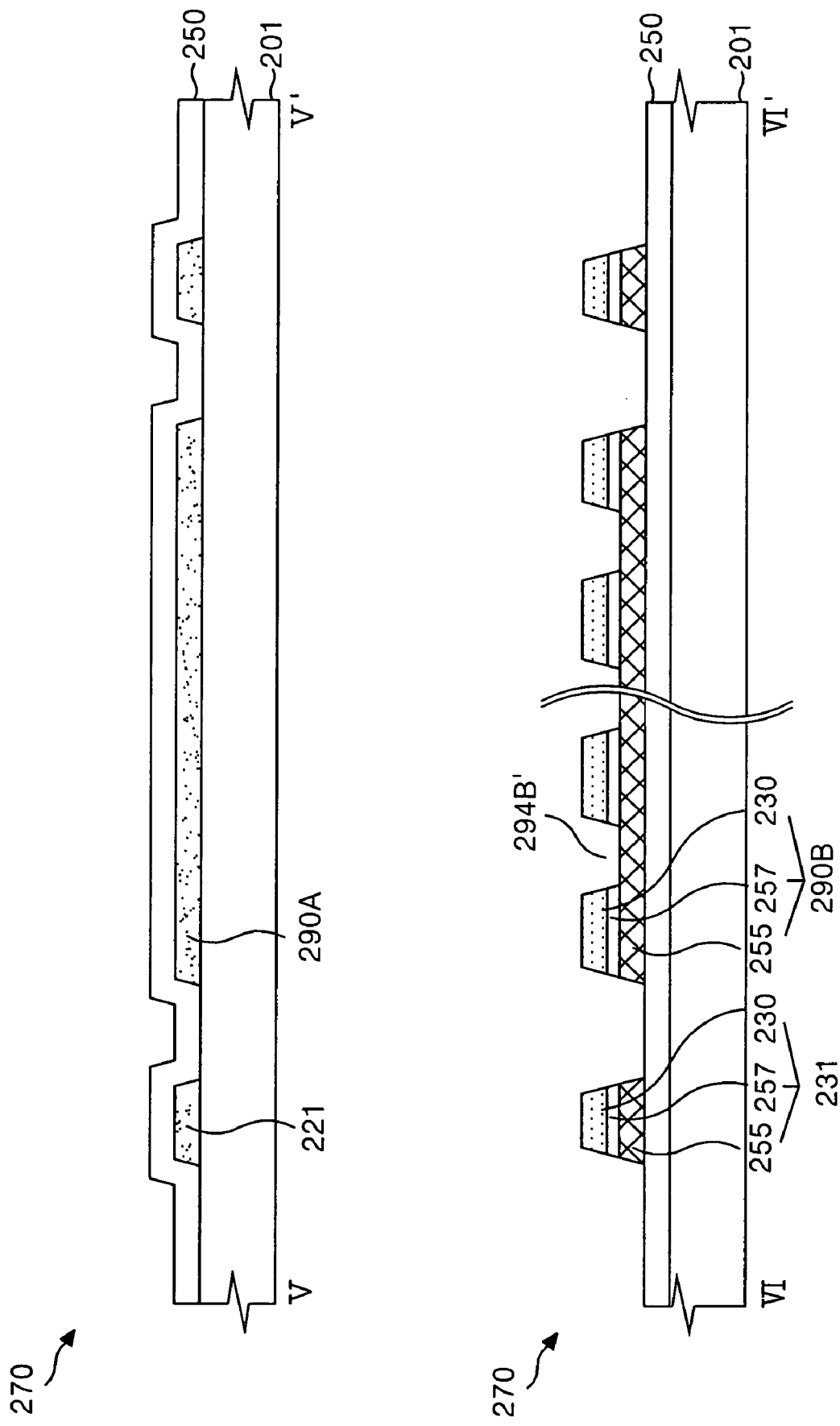

Referring to FIG. 13B, the gate insulating film 250 is formed on the lower substrate 201 where the first conductive pattern group is formed, and a second conductive pattern group including the data link 231 and second common line 290B that include a data metal pattern 230 and a semiconductor pattern including the active layer 255 and the ohmic contact layer 257 is formed on the gate insulating film 250.

To describe a step of forming the second conductive pattern group in detail, the gate insulating film 250, an amorphous silicon layer, an n+ amorphous silicon layer and a data metal layer are sequentially formed by a deposition method such as PECVD, sputtering on the lower substrate 201 where the first conductive pattern group is formed. Herein, a material of the gate insulating film 250 may be an inorganic insulating material such as silicon oxide SiOx or silicon nitride SiNx. The data metal layer may be formed in a single or multiple layer structure of metal such as Al, Mo, Cr, Cu, Al alloy, Mo alloy, Cr alloy, Cu alloy, etc.

Subsequently, a photo-resist pattern is formed in an area where the second supply contact hole part is to be formed on the data metal layer. The data metal layer is patterned by a wet etching process using the photo-resist pattern, thereby forming the second conductive pattern group including the data link 231 and the second common line 290B.

After removing the portion of the photo-resist pattern with a lower height in the second supply contact area by an ashing process, the ohmic contact layer and the data metal pattern 230 of the second supply contact hole are etched by a dry etching process. Accordingly, an upper plane of the active layer 255 of the data supply contact hole part and a side surface of the metal layer 230 and the ohmic contact layer 257 are exposed to form a primary second supply contact hole 294B'.

Subsequently, the photo-resist pattern remaining behind on the second conductive pattern group is removed by a stripping process.

Figure 13C:
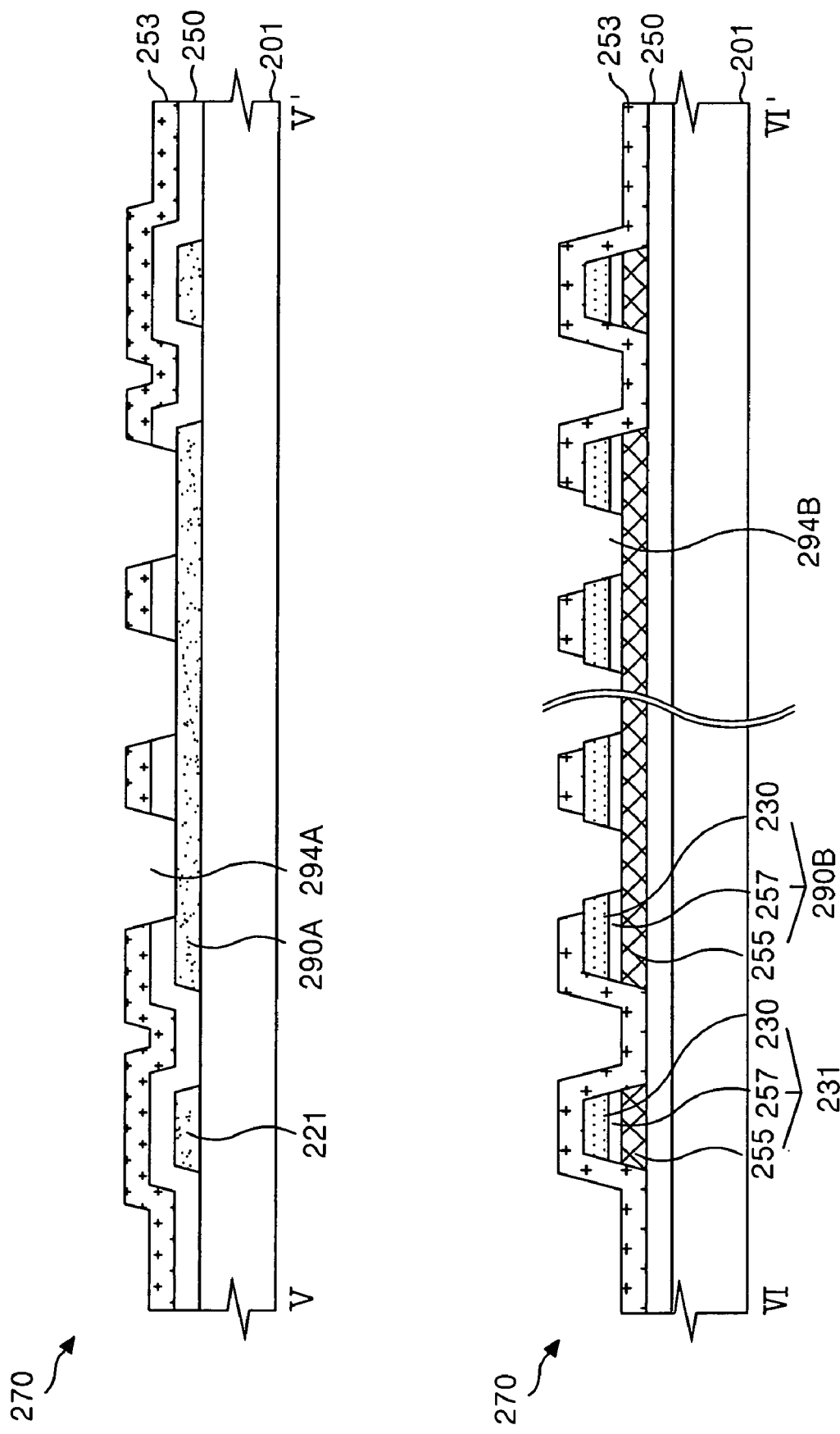

Referring to FIG. 13C, the passivation film 253 is formed on the gate insulating film 250 where the second conductive pattern group is formed, and a first supply contact hole 294A and a second supply contact hole 294B are formed thereon.

To describe a process of FIG. 13C in detail, the passivation film 253 is formed by a deposition method such as PECVD, etc. on the entire surface of the gate insulating film 250 where the second conductive pattern group is formed. Subsequently, the passivation film 253 is patterned by a photolithography process and an etching process, thereby forming the first supply contact hole 294A and the second supply contact hole 294B. The first supply contact hole 294A penetrates the passivation film 253 and the insulating film 250 to expose the first common line 290A, and the second supply contact hole 294B penetrates the passivation film 253 to expose the upper plane of the active layer 255 and the side surface of the metal layer 230 and the ohmic contact layer 257.

The passivation film 253 may be an inorganic insulating material like the gate insulating film 250 or an organic insulating material such as PFCB, BCB or acrylic organic compound having a low dielectric constant.

The second supply contact hole 294B in FIGS. 13B and 13C can be formed to expose only the upper plane of the metal layer 230.

Figure 13D:
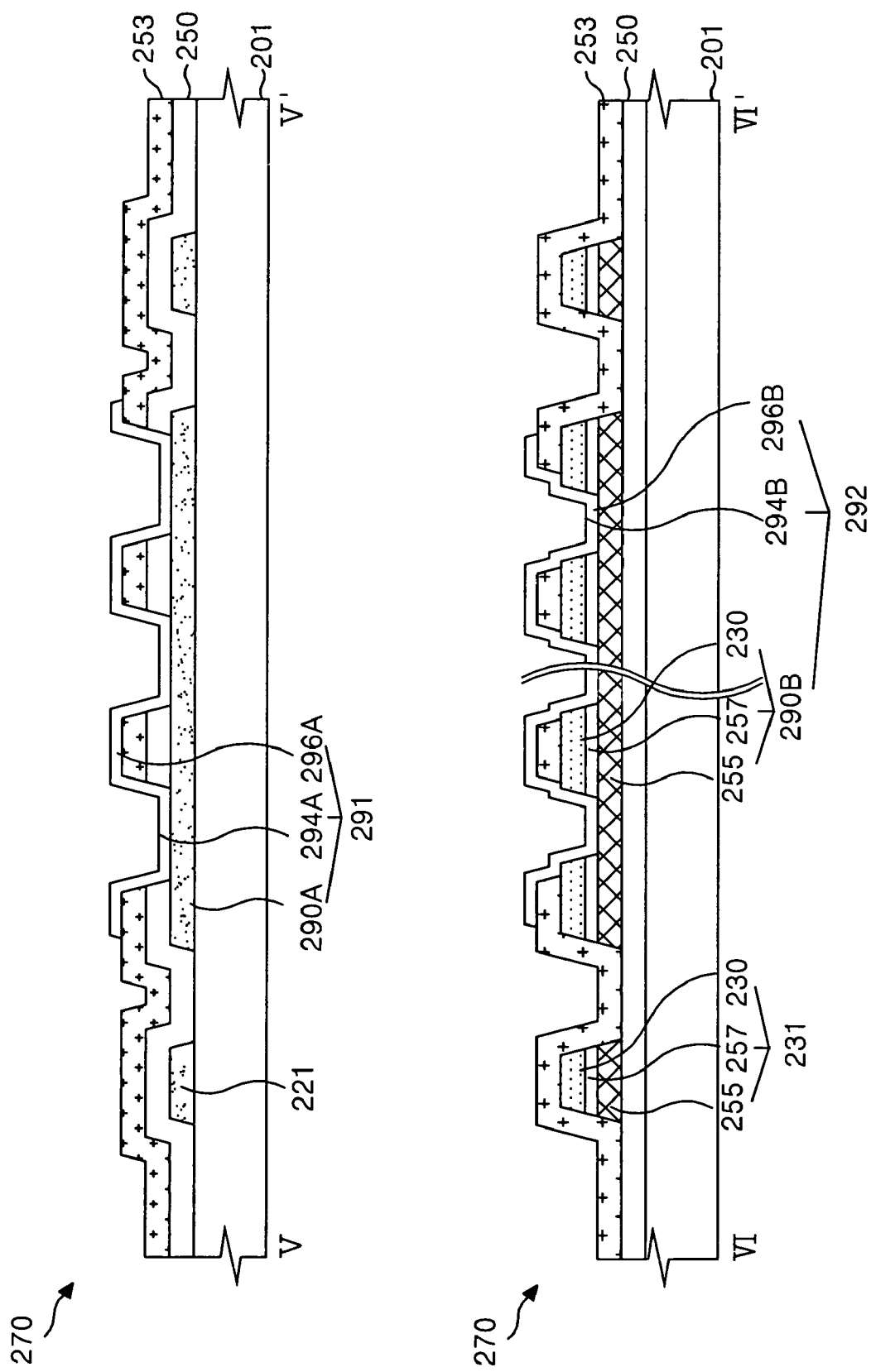

Referring to FIG. 13D, the first connecting part 291 and the second connecting part 292 are formed as the first conductive pattern 296A and the second conductive pattern 296B are formed on the passivation film 253.

To describe forming the first conductive pattern 296A and the second conductive pattern 296B in detail, a transparent conductive metal layer is spread over the passivation film 253 by a deposition method such as sputtering. Subsequently, the transparent conductive metal layer is patterned by a photolithography process and an etching process, thereby forming the first conductive pattern 296A and the second conductive pattern 296B.

Herein, any one of indium tin oxide ITO, tin oxide TO, indium tin zinc oxide ITZO and indium zinc oxide IZO may be used as a material of the transparent conductive metal layer.

The first conductive pattern 296A is connected to a first common line 290A through the first supply contact hole 294A, and the second conductive pattern 296B is connected to the second common line 290B through the second supply contact hole 294B.

A thin film transistor array substrate that includes the first connecting part 291 and the second connecting part 292 which are formed in different structures in the foregoing FIGS. 11A to 13D is only illustrated, but the thin film transistor array substrate according to the present invention may be formed to have any one of the first connecting part 291 and the second connecting part 292.

When the thin film transistor array substrate according to the present invention is formed to include all the first connecting part 291 and second connecting part 292, the first connecting part 291 and the second connecting part 292 are connected by having the first conductive pattern and the second conductive pattern formed to be connected.

FIG. 14 is a diagram showing a fabricating step of a conductive ball included in the conductive spacer 184 shown in FIGS. 11B and 12B.

Referring to FIG. 14, the conductive ball is formed by coating a conductive material such as silver Ag, gold Au, etc. on the outside of a ball spacer of ceramic material so as to be able to have conductivity and to maintain its height. The material of the ball spacer may be silica or plastic instead of ceramic. The conductive ball of the present invention may maintain its height even against a designated pressure as compared to the conductive ball included in an anisotropic conductive film ACF.

As described above, the liquid crystal display device and the fabricating method thereof according to the present invention has the supply pattern formed to overlap the sealant and the gate link, wherein the supply pattern is required to supply the voltage to the common electrode. Such a supply pattern causes the resistance to be decreased versus the supply pattern of the dot shape, thus the power consumption decreases and the common voltage change due to the line resistance is prevented, thereby improving picture quality. Further, the liquid crystal display device and the fabricating method thereof according to the present invention has the supply pattern formed to overlap the sealant so as to reduce the liquid crystal margin area by the width of the supply pattern, thus it is possible to make the liquid crystal display device in small size. In addition, the liquid crystal display device and the fabricating method thereof according to the present invention connects the common electrode and the connecting part by use of the conductive spacer included in the sealant, thus no separate silver dotting process is required and the process is simplified.

Further, the liquid crystal display device and the fabricating method thereof according to the present invention increases the number of points through which the common voltage is supplied to the color filter substrate by way of changing the pattern formed on the thin film transistor substrate, thereby making it possible to supply the common voltage in a more stable manner than when supplying the common voltage to the color filter substrate through silver dots. Because the common voltage is stably supplied to the color filter substrate, the liquid crystal display device according to the present invention can overcome defects such as greenish, residual image, etc.

The liquid crystal display device and the fabricating method thereof according to the present invention forms the conductive pattern which supplies the common voltage so as not to overlap the gate link and the data link, thereby preventing beforehand the phenomenon that the gate link and the data link become short-circuited with the conductive pattern.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    an upper substrate where a common electrode is formed;
    a lower substrate that faces the upper substrate;
    a plurality of gate drive integrated circuits that supplies a gate signal to a gate line that is located on the lower substrate;
    a plurality of data drive integrated circuits that supplies a data signal to a data line that is located on the lower substrate;
    a common line that supplies a common voltage to the common electrode through the gate drive integrated circuit and the data drive integrated circuit when driving a liquid crystal, wherein the common line includes a first common line passing through the gate drive integrated circuits; and a second common line passing through the data drive integrated circuits;
    a conductive sealant that electrically connects the common electrode to the common line in one of an area between adjacent gate drive integrated circuits and between adjacent data drive integrated circuits;
    a gate insulating film that covers the first and second common lines;
    a passivation film formed on the gate insulating film;
    a first supply contact hole that penetrates the gate insulating film and the passivation film to expose the first common line;
    a second supply contact hole which penetrates the gate insulating film and the passivation film to expose the second common line;
    a first conductive pattern that is in contact with the first common line through the first supply contact hole and with the conductive sealant; and
    a second conductive pattern that is in contact with the second common line through the second supply contact hole and with the conductive sealant.

2. The liquid crystal display device according to claim 1, wherein the lower substrate is divided into an array area where a plurality of pixel cells are located and a non-array area which encompasses the array area, and the common line extends to the non-array area that is in an opposite direction to the data drive integrated circuit with the array area therebetween and is electrically connected to the conductive sealant in the non-array area that is in the opposite direction to the data drive integrated circuit.

3. The liquid crystal display device according to claim 2, wherein an area where the common line formed in the opposite direction to the data drive integrated circuits with the array area therebetween is electrically connected to the conductive sealant and is symmetric to an area where the common line between the adjacent data drive integrated circuits is electrically connected to the conductive sealant.

4. The liquid crystal display device according to claim 1, wherein the lower substrate is divided into an array area where a plurality of pixel cells are located and a non-array area that encompasses the array area, and the common line extends to the non-array area that is in an opposite direction to the gate drive integrated circuit with the array area therebetween and is electrically connected to the conductive sealant in the non-array area that is in the opposite direction to the gate drive integrated circuit.

5. The liquid crystal display device according to claim 4, wherein an area where the common line formed in the opposite direction to the gate drive integrated circuits with the array area therebetween is electrically connected to the conductive sealant and is symmetric to a part where the common line between the adjacent gate drive integrated circuits is electrically connected to the conductive sealant.

6. The liquid crystal display device according to claim 1, wherein the conductive sealant includes one of a conductive glass fiber and a conductive ball.

7. The liquid crystal display device according to claim 6, wherein the conductive ball includes a ball spacer made of one of ceramic, silica, and plastic.

8. The liquid crystal display device according to claim 1, further including:
a gate link extending from the gate line connected to the gate drive integrated circuit; and
a data link extending from the data line connected to the data drive integrated circuit.

9. The liquid crystal display device according to claim 8, wherein the common line is located at an outer part of the gate links that are commonly connected to one gate drive integrated circuit.

10. The liquid crystal display device according to claim 8, wherein the common line is located at an outer part of the data links that are commonly connected to one data drive integrated circuit.

11. The liquid crystal display device according to claim 8, wherein the first common line and the second common line are formed of the same material as the gate link and at the same time.

12. The liquid crystal display device according to claim 8, wherein the first and second conductive patterns are formed in an area that does not overlap the gate link.

13. A liquid crystal display device, comprising:
an upper substrate where a common electrode is formed;
a lower substrate that faces the upper substrate;
a plurality of gate drive integrated circuits that supplies a gate signal to a gate line that is located on the lower substrate;
a plurality of data drive integrated circuits that supplies a data signal to a data line that is located on the lower substrate;
a common line that supplies a common voltage to the common electrode through the gate drive integrated circuit and the data drive integrated circuit when driving a liquid crystal, wherein the common line includes a first common line passing through the gate drive integrated circuits; and a second common line passing through the data drive integrated circuits;
a conductive sealant that electrically connects the common electrode to the common line in one of an area between adjacent gate drive integrated circuits and between adjacent data drive integrated circuits;
a passivation film formed to cover the first and second common lines;
a first supply contact hole that penetrates the passivation film to expose the first common line;
a second supply contact hole that penetrates the passivation film to expose the second common line;
a first conductive pattern that is in contact with the first common line through the first supply contact hole and with the conductive sealant; and
a second conductive pattern that is in contact with the second common line through the second supply contact hole and with the conductive sealant.

14. The liquid crystal display device according to claim 13, wherein the first common line and the second common line are formed of the same material as a data link extending from the data line connected to the data drive integrated circuit and at the same time.

15. The liquid crystal display device according to claim 13, wherein the first and second conductive patterns are formed in an area that does not overlap a data link extending from the data line connected to the data drive integrated circuit.

16. A liquid crystal display device, comprising:
an upper substrate where a common electrode is formed;
a lower substrate that faces the upper substrate;
a plurality of gate drive integrated circuits that supplies a gate signal to a gate line that is located on the lower substrate;
a plurality of data drive integrated circuits that supplies a data signal to a data line that is located on the lower substrate;
a common line that supplies a common voltage to the common electrode through the gate drive integrated circuit and the data drive integrated circuit when driving a liquid crystal, wherein the common line includes a first common line passing through the gate drive integrated circuits; and a second common line passing through the data drive integrated circuits;
a conductive sealant that electrically connects the common electrode to the common line in one of an area between adjacent gate drive integrated circuits and between adjacent data drive integrated circuits;
a gate insulating film that covers the first common line;
a passivation film that covers the second common line on the gate insulating film;
a first supply contact hole that penetrates the gate insulating film and the passivation film to expose the first common line;
a second supply contact hole that penetrates the passivation film to expose the second common line;
a first conductive pattern that is in contact with the first common line through the first supply contact hole and with the conductive sealant; and
a second conductive pattern that is in contact with the second common line through the second supply contact hole and with the conductive sealant.

17. The liquid crystal display device according to claim 16, wherein the first common line is formed of the same material as a gate link extending from the gate line connected to the gate drive integrated circuit and at the same time and the second common line is formed of the same material as a data link extending from the data line connected to the data drive integrated circuit and at the same time.

18. The liquid crystal display device according to claim 16, wherein the first and second conductive patterns are formed in an area that does not overlap the a gate link extending from the gate line connected to the gate drive integrated circuit and a data link extending from the data line connected to the data drive integrated circuit.

19. A liquid crystal display device, comprising:
a common electrode on an upper substrate;
a signal line on the lower substrate that is opposite to the upper substrate, wherein the signal line is one of a gate line formed on the lower substrate and a data line;
a second common line formed on one side of the lower substrate to be adjacent to the gate line;
a contact hole that penetrates the insulating film of at least one layer to expose the second common line;
a supply pattern that overlaps a signal line that is on a lower substrate that is opposite to the upper substrate with an insulating film of at least one layer therebetween to supply a common voltage to the common electrode and that is in contact with the second common line through the contact hole; and
a sealant including a conductive spacer that bonds the upper substrate to the lower substrate and electrically connects the common electrode to the supply pattern.

20. The liquid crystal display device according to claim 19, wherein the conductive spacer is formed of one of a conductive glass fiber and a conductive ball.

21. The liquid crystal display device according to claim 19, further including: a pixel electrode in a pixel area to generate an electric field with the common electrode.

22. The liquid crystal display device according to claim 21, further including: a reflection electrode formed in a reflection area of the pixel area.

23. The liquid crystal display device according to claim 22, wherein the contact hole is formed in an area that overlaps the sealant.

24. The liquid crystal display device according to claim 21, wherein the supply pattern is of the same material as one of the pixel electrode and the reflection electrode.

* * * * *